United States Patent
Silverman et al.

(10) Patent No.: US 7,499,047 B2
(45) Date of Patent: Mar. 3, 2009

(54) INK EDITING ARCHITECTURE

(75) Inventors: Andrew Silverman, Seattle, WA (US); Sam George, Duvall, WA (US); Shiraz Somji, Kenmore, WA (US); Koji Kato, Sammamish, WA (US); Brigette Krantz, Redmond, WA (US); Alex Mogilevsky, Bellevue, WA (US); Mark Douglas Harper, Redmond, WA (US); Quan Binh To, Redmond, WA (US); Vladimir Smirnov, Bothell, WA (US); Benjamin M. Westbrook, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/845,430

(22) Filed: Aug. 27, 2007

(65) Prior Publication Data

US 2007/0292032 A1    Dec. 20, 2007

Related U.S. Application Data

(60) Division of application No. 10/692,015, filed on Oct. 24, 2003, now Pat. No. 7,262,785, which is a continuation-in-part of application No. 10/644,896, filed on Aug. 21, 2003.

(51) Int. Cl.
    *G06T 15/00* (2006.01)
(52) U.S. Cl. .................. 345/418; 345/156; 358/1.9; 358/1.15; 358/3.28
(58) Field of Classification Search ............ 345/156, 345/179, 173, 418; 358/1.9, 1.15, 3.28
    See application file for complete search history.

(56) References Cited

U.S. PATENT DOCUMENTS

| | | | |
|---|---|---|---|
| 4,633,436 A | 12/1986 | Flurry | |
| 5,347,620 A | 9/1994 | Zimmer | |
| 5,534,893 A | 7/1996 | Hansen, Jr. et al. | |
| 5,892,399 A * | 4/1999 | Milam | 330/264 |
| 5,982,399 A | 11/1999 | Scully et al. | |
| 6,111,565 A | 8/2000 | Chery et al. | |
| 6,326,957 B1 | 12/2001 | Nathan et al. | |
| 6,651,221 B1 | 11/2003 | Thompson et al. | 715/541 |
| 6,667,739 B2 * | 12/2003 | Atwood et al. | 345/173 |
| 6,681,045 B1 | 1/2004 | Lapstun et al. | 345/179 |
| 6,707,473 B2 | 3/2004 | Dresevic et al. | |
| 6,724,372 B1 * | 4/2004 | Bi et al. | 345/179 |
| 6,909,430 B2 | 6/2005 | Dresevic et al. | |

(Continued)

OTHER PUBLICATIONS

Walid G. Aref et al., "On Handling Electronic Ink", ACM Computing Surveys, vol. 27, No. 4, Dec. 1995.

(Continued)

*Primary Examiner*—Phu K Nguyen
(74) *Attorney, Agent, or Firm*—Lee & Hayes, PLLC

(57) ABSTRACT

A system and process for capturing and rendering ink is described. An ink canvas object may contain none, one, or more objects or elements and may specify the z-order of the objects or elements. The ink canvas object may host a variety of objects or elements and, therefore, provide ink functionality to the objects or elements, even though the objects or elements themselves may not have ink functionality. The ink canvas object is attached to an ink editor that has an associated modifiable ink editor behavior, whereby ink specific behaviors are collected in the ink edit behavior.

13 Claims, 23 Drawing Sheets

U.S. PATENT DOCUMENTS

| | | |
|---|---|---|
| 7,096,199 B2 | 8/2006 | Lapstun et al. ............. 358/1.15 |
| 7,190,346 B2 | 3/2007 | Lapstun et al. ............. 345/156 |
| 7,190,375 B2 | 3/2007 | Dresevic et al. |
| 7,190,491 B2 | 3/2007 | Silverbrook et al. ....... 358/3.28 |
| 2002/0157880 A1 | 10/2002 | Atwood et al. |
| 2005/0052433 A1 | 3/2005 | Silverman et al. |
| 2005/0093836 A1 | 5/2005 | Dodge et al. |
| 2007/0176904 A1 | 8/2007 | Russo |

OTHER PUBLICATIONS

Walid Aref et al., "The Handwritten Trie: Indexing Electronic Ink", Matsushita Information Technology Laboratory, pp. 151-162, ACM 0-8971-731—Jun. 1995.

Patrick Chiu et al., "A Dynamic Grouping Technique for Ink and Audio Notes", ACM, pp. 195-202, 1998.

David Bargeron et al., "Reflowing Digital Ink Annotations", vol. 5, Issue No. 1, pp. 385-392, Apr. 5-10, 2003.

Gene Golovchinsky et al., "Moving Markup: Repositioning Freeform Annotations", UIST'02, vol. 4, Issue 2, pp. 21-29, Oct. 27-30, 2002.

Andrè Meyer, "Pen Computing", SIGCHI Bulletin, vol. 27, No. 3, Jul. 1995.

Bill N. Schilit et al. "Beyond Paper: Supporting Active Reading with Free Form Digital Ink Annotations", pp. 249-256, CHI 98, Apr. 18-23, 1998.

Lynn D. Wilcox et al., "Dynomite: A Dynamically Organized Ink and Audio Notebook", pp. 186-193, CHI 97, Mar. 22-27, 1997.

Marcel Götze et al., "The Intelligent Pen-Toward a Uniform Treatment of Electronic Documents", Int. Symp. On Smart Graphics, pp. 129-135, Jun. 11-13, 2002.

Jason I. Hong et al., "SATIN: A Toolkit for Informal Ink-based Applications", UIST '00, CHI Letters vol. 2, pp. 63-72, 2000.

S.C. Hsu et al., "Skeletal Strokes", UIST'93, pp. 197-206, Nov. 3-5, 1993.

Thomas P. Moran et al., "Pen-Based Interaction Techniques For Organizing Material on an Electronic Whiteboard", UIST '97, pp. 45-54, 1997.

Lisa Stifelman et al., "The Audio Notebook" Paper and Pen Interaction with Structured Speech, CHI 2001, pp. 182-189, vol. No. 3, Issue No. 1, Mar. 31-Apr. 5, 2001

Steve Strassmann, "Hairy Brushes", ACM, vol. 20, No. 4, pp. 225-232, Aug. 18-22, 1986.

Zouheir Trabelsi et al., "A Voice and Ink XML Multimodal Architecture for Mobile e-Commerce Systems", ACM, pp. 100-104, 2002.

Cohen, et al, "Harold: A World Made of Drawings", ACM, 2002, pp. 83-90.

Golovchinsky, et al, "Moving Markup: Repositioning Freeform Annotations", ACM, vol. 4, Issue 2, pp. 21-24, Oct. 2002.

Saund, et al, "Perceptually-Supported Image Editing of Text and Graphics", ACM, vol. 5, Issue 2, pp. 183-192, 2004

Saund, et al, "Stylus Input and Editing without Prior Selection of Mode", ACM, vol. 5, Issue 2, 2003, pp. 213-216.

\* cited by examiner

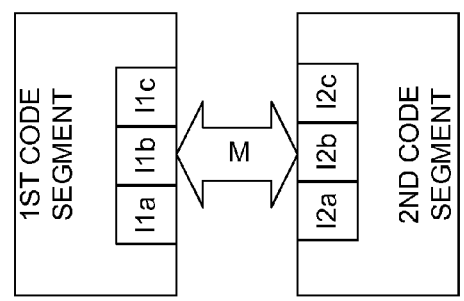
FIGURE 1C
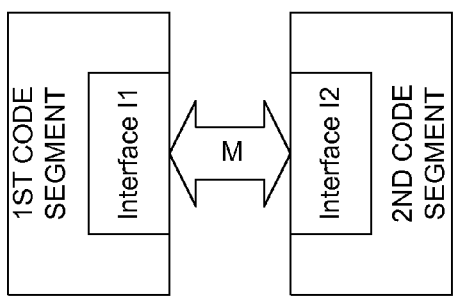
FIGURE 1E
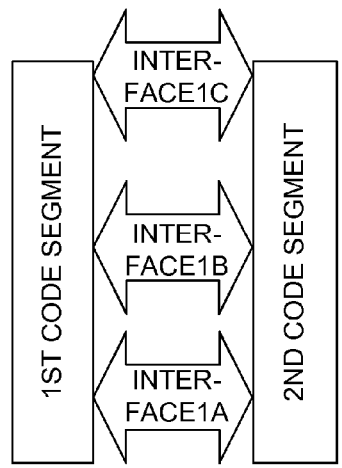
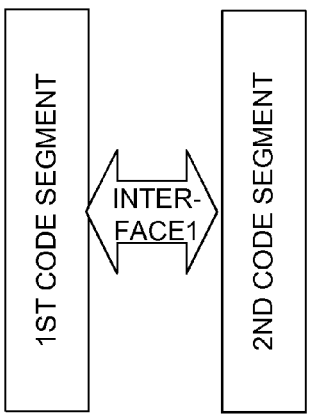
FIGURE 1B
FIGURE 1D

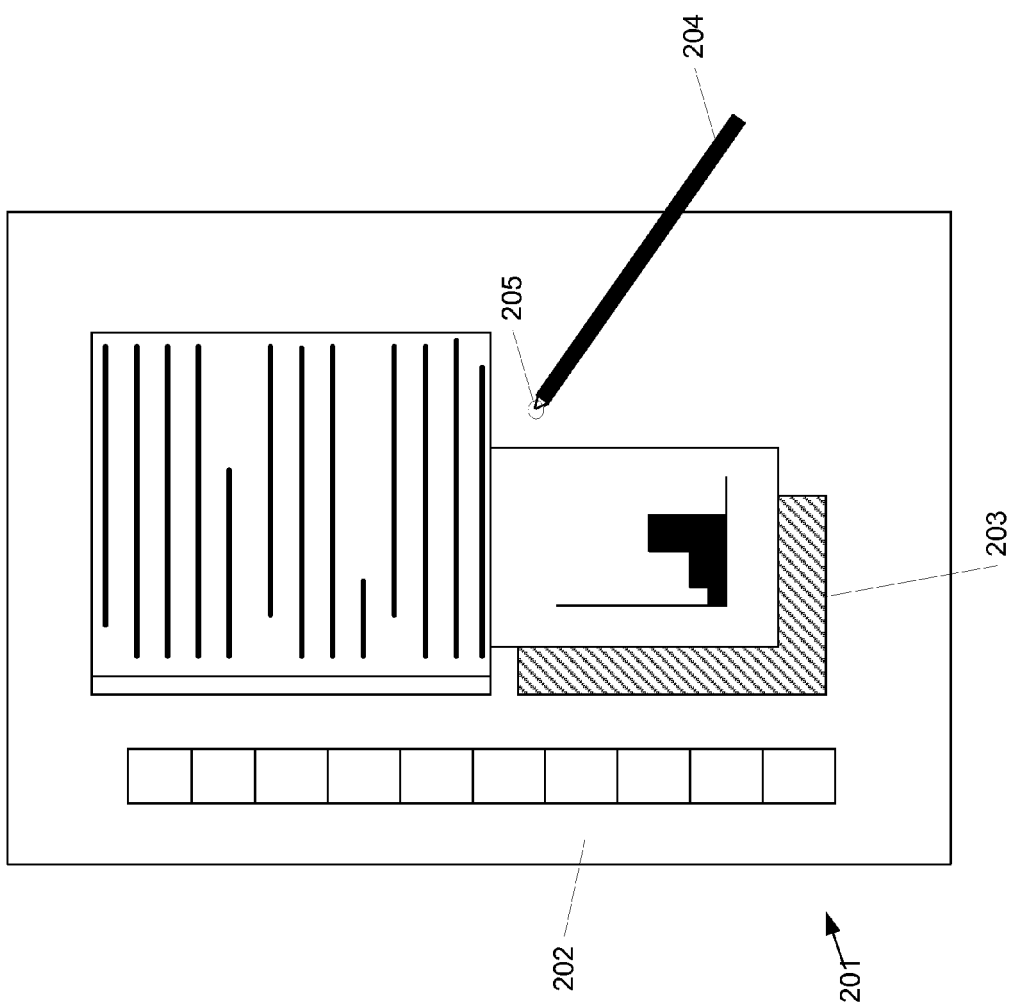

INK EDITING ARCHITECTURE

RELATED APPLICATION INFORMATION

This application is a divisional of U.S. Ser. No. 10/692,015, filed on Oct. 24, 2003, which is a continuation in part of U.S. Ser. No. 10/644,896, filed on Aug. 21, 2003, entitled "Ink Collection and Rendering", whose contents are expressly incorporated herein.

FIELD OF THE INVENTION

Aspects of the present invention relate to information capturing and rendering. More specifically, aspects of the present invention relate to providing an architecture for editing electronic ink.

DESCRIPTION OF RELATED ART

People often rely on graphical representations more than textual representations of information. They would rather look at a picture than a block of text that may be equivalent to the picture. For instance, a home owner may cut out pictures from magazines to show contractors exactly what is desired when remodeling a kitchen or bathroom. Textual descriptions of the same material often fall short. The tool that the home owner may use is no more complex than a pair of scissors.

In the computing world, however, attempting to capture and convey the identical content is cumbersome. Typical computer systems do not provide an easy interface for capturing and conveying graphically intensive content. Rather, they are optimized for capturing and rendering text. For instance, typical computer systems, especially computer systems using graphical user interface (GUI) systems, such as Microsoft WINDOWS, are optimized for accepting user input from one or more discrete input devices such as a keyboard for entering text, and a pointing device such as a mouse with one or more buttons for driving the user interface.

Some computing systems have expanded the input and interaction systems available to a user by allowing the use of a stylus to input information into the systems. The stylus may take the place of both the keyboard (for data entry) as well as the mouse (for control). Some computing systems receive handwritten electronic information or electronic ink and immediately attempt to convert the electronic ink into text. Other systems permit the electronic ink to remain in the handwritten form.

Despite the existence of a stylus, various approaches to combining electronic ink with a typical graphical user interface may be cumbersome for developers of third party applications. Accordingly, there is a need in the art for an improved system for capturing, editing, and rendering ink that is friendly for third party developers.

BRIEF SUMMARY

Aspects of the present invention address one or more of the issues mentioned above, thereby providing better content capture, editing, and rendering for use by third party developers. In some embodiments, the ink capturing, editing, and rendering aspects may be manifest as an object that is part of a structure in which each element in an interface may be specified in depth (or z-order). In some cases, the object may render the various elements in the interface in their specified z-order and then render ink on the top-most layer. In other cases, the ink and other elements may be intermingled. Additional aspects of the invention relate to providing an architecture for editing ink.

These and other aspects are addressed in relation to the Figures and related description.

BRIEF DESCRIPTION OF THE DRAWINGS

The present invention is illustrated by way of example and not limited in the accompanying figures in which like reference numerals indicate similar elements and in which:

FIG. 2 shows a display for a stylus-based input system according to aspects of the present invention.

DETAILED DESCRIPTION OF THE DRAWINGS

Figure 1:
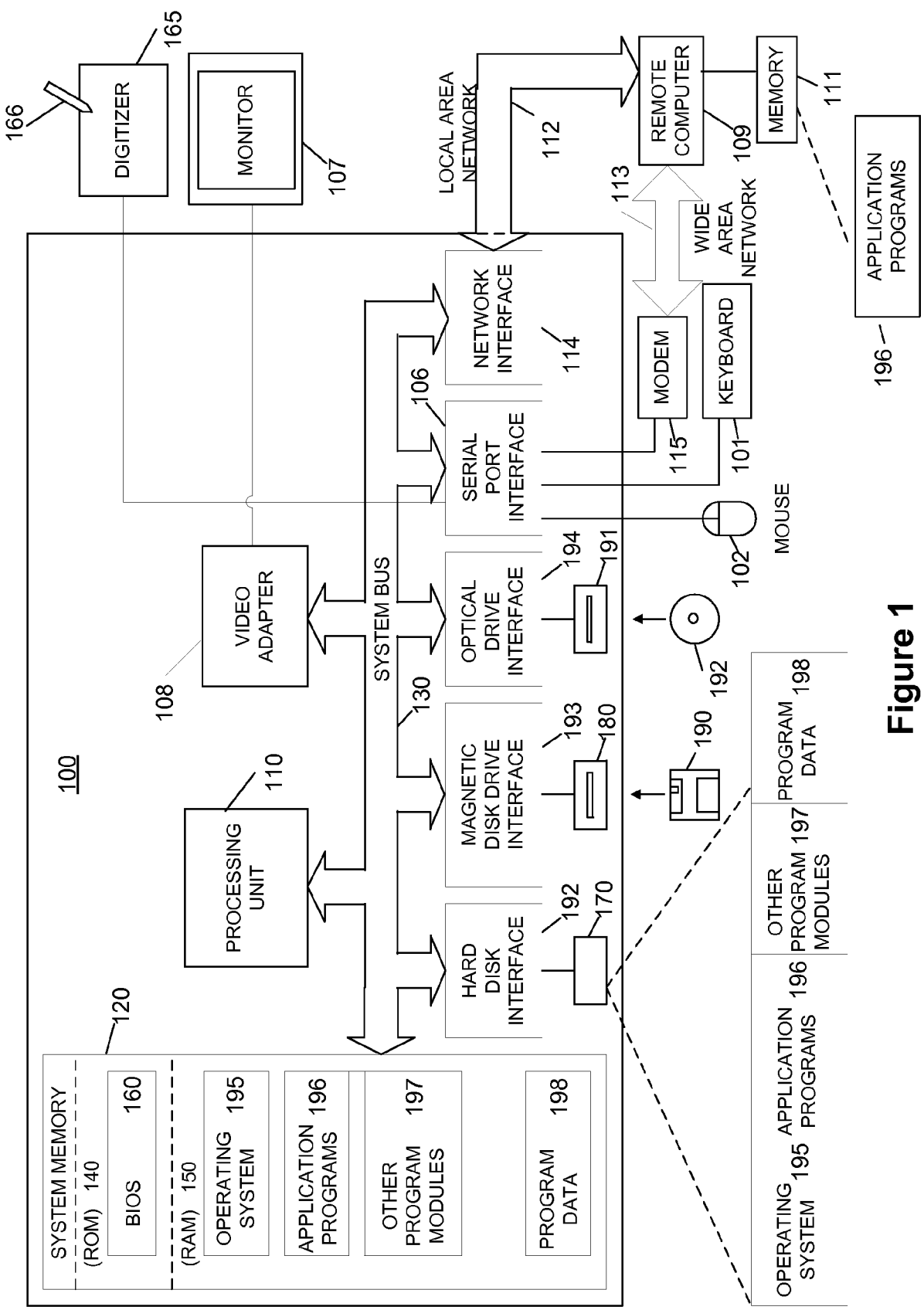
FIG. 1 shows a general-purpose computer supporting one or more aspects of the present invention.

Aspects of the present invention relate to an improved ink capturing, editing, and rendering system and method. Aspects of the invention permit one or more of the following:

A mode in which ink can be written even when a selection is present.

Allows a user to edit elements and ink together.

Includes an approach for determining whether an arbitrary region is enclosed within a lasso, which is used for selecting hosted objects.

Permits editing of sub-elements.

Permits attachment of ink editing behaviors to arbitrary elements.

This document is divided into sections to assist the reader. These sections include: characteristics of ink; terms; general-purpose computing environment; ordering of objects; constructors, properties, methods, and events of objects; relationships; clipping; ink editor and ink editor behaviors; erasing ink; selection modes; sub-element editing; renderer integration; and interface definitions.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence of strokes, where each stroke is comprised of a sequence of points. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink), among other information.

Terms

Ink—A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level.

Ink object—A data structure storing ink with or without properties.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device).

Elements—Objects that are placed in a tree, with their placement in the tree serving as an order. They are also handle persistence of ink and input.

Adorners—Adorners are visual decorations attached to objects by editing tools. They serve at least two purposes:
 1) Provide visual feedback for selection and available editing operations; and
 2) Provide a target for action-specific hit testing.

Service—A component (with no restrictions on type), which can be specified, enabled or disabled by its "type" at any element in a tree structure. The element where the service is defined is known as its "scope." The service is available for all children of the element unless explicitly disabled or replaced. Services may be defined and enable programmatically or declaratively.

Designer—A design component with knowledge of a particular element. It translates "conceptual" commands (like "move") to a tree and property changes specific for the element (e.g. could be change of X, Y or Dock, depending on parent element)

Edit Behavior—A component (often a "service," though not necessarily) responsible for processing input events. Receives events from an edit router component.

Edit Router—Manages one or more edit behavior components using a stack (where behaviors can be temporarily suspended and resumed) and/or a group (where multiple behaviors can be active simultaneously). Routes events to active edit behavior component(s), with an optional event filter.

Event Filter—An optional filter that may be attached to an edit router component for preliminary processing of events. It can modify events or event routing.

Selection—A component representing content currently selected by the user. The selection is not necessarily a collection of elements. It may be a range (or ranges) of text, area of an image, and the like. Also, the selection can be mixed (combinations of different elements, ranges of text, areas of an image and the like). Specific data types which require special handling in selection may have a "selection type" associated with them. Selection Type describes an object implementing ISelection. ISelection is an interface that allows an editing framework to determine which editor to use for a specific element. A specific editor is generally associated with a selection. The editor-selection pair describes a majority of data-type-specific editing logic.

Editor—A super edit behavior component that is responsible for activating subordinate edit behaviors. It can do this based on heuristics or based on an attached property (that specifies the activation of the subordinate edit behaviors).

Selection Router—A specialized edit router, which creates selection and editor objects as needed and directs events to the appropriate editor, based on type of element the event comes from. Selection router (and an optionally associated event filter) is responsible for in-place activation and managing mixed selection.

General-Purpose Computing Environment

FIG. 1 illustrates a schematic diagram of an illustrative conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In one embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device. Further, the system may include wired and/or wireless capabilities. For example, network interface 114 may include Bluetooth, SWLan, and/or IEEE 802.11 class of combination abilities. It is appreciated that other wireless communication protocols may be used in conjunction with these protocols or in place of these protocols.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface 1 may be subdivided to convert the communications of the interface into multiple interfaces Interface 1A, Interface 1B, Interface 1C, etc. while achieving the same result. As illustrated in FIG. 1E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1 st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1G:
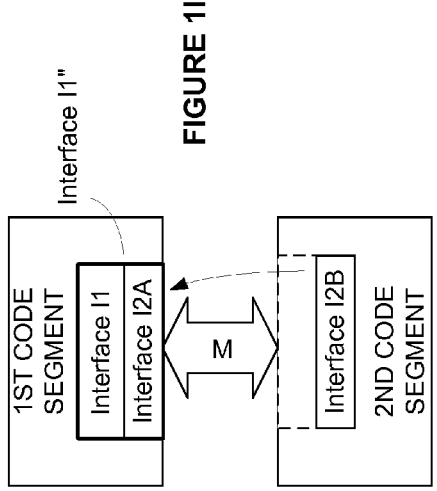
Figure 1I:
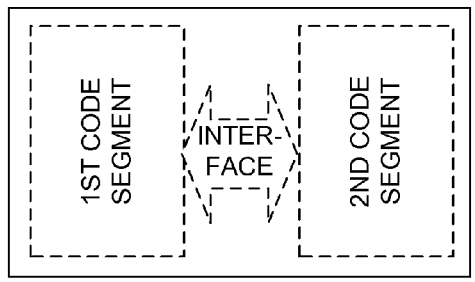
Figure 1F:
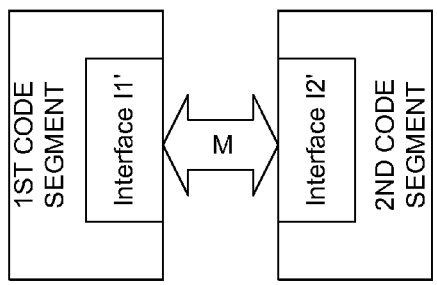

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
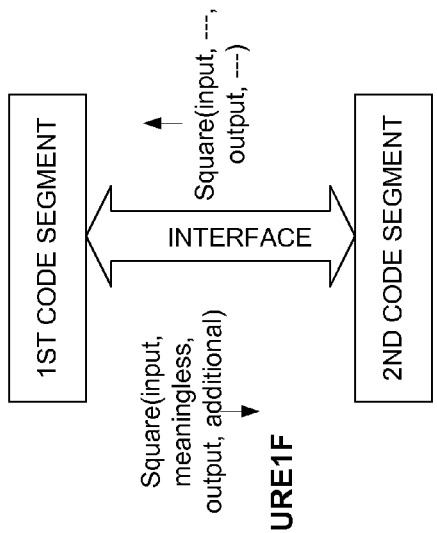

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2$a$ and I2$b$, and interface portion I2$a$ has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
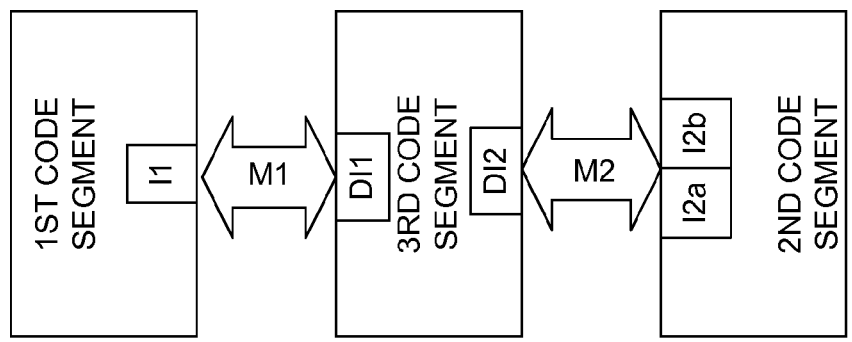
Figure 1J:
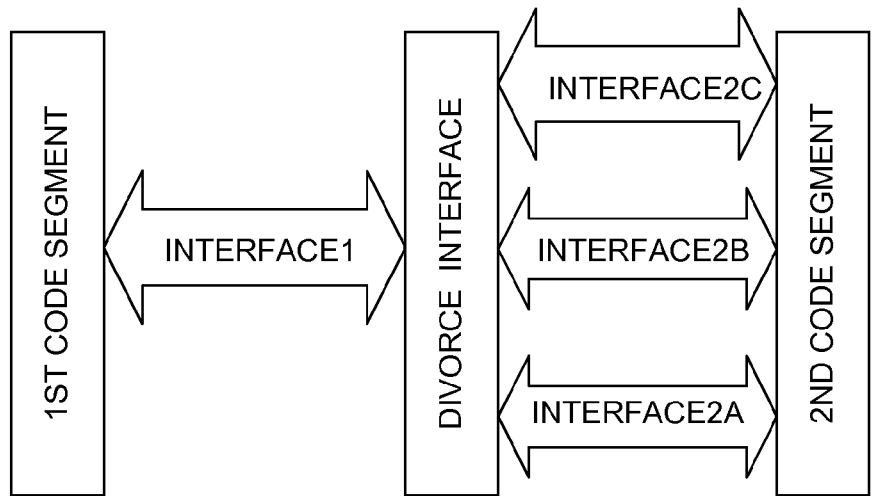

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
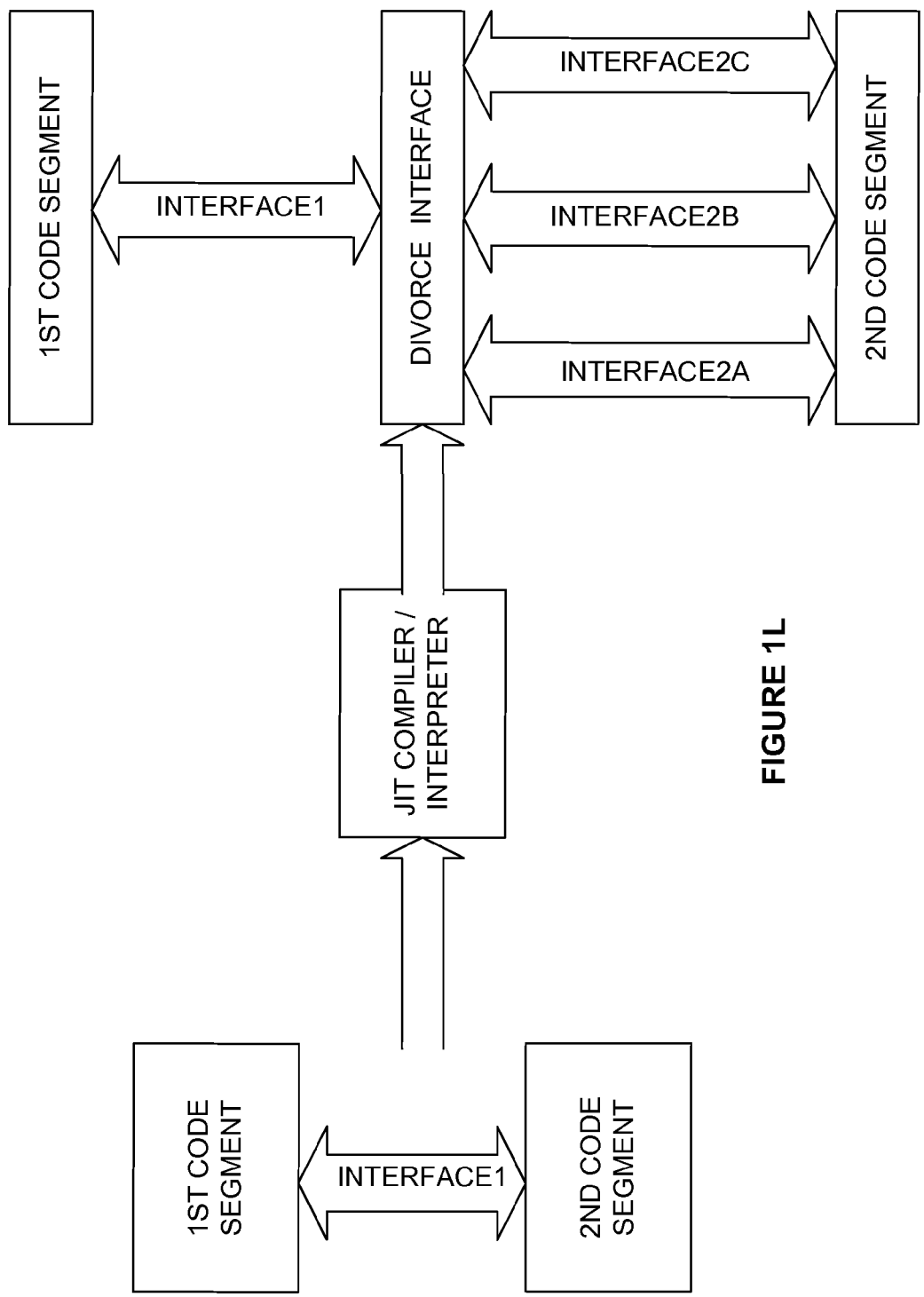
Figure 1M:
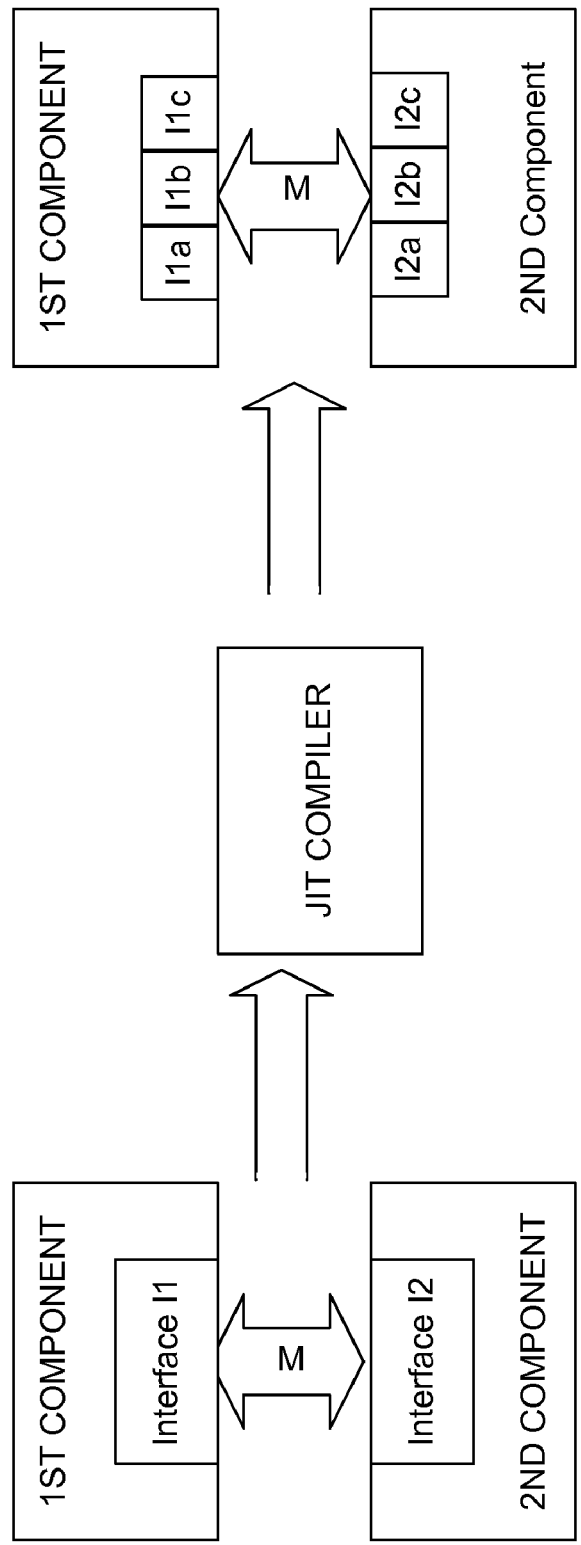

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Ordering of Objects

Figure 3B:
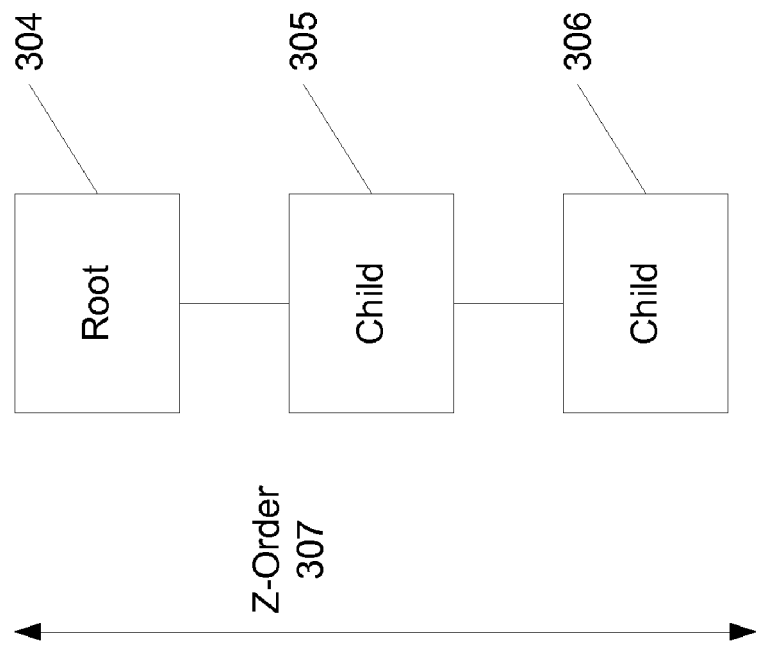
FIGS. 3A and 3B show various examples of interfaces and how ordering is controlled in each in accordance with aspects of the invention.
Figure 3A:
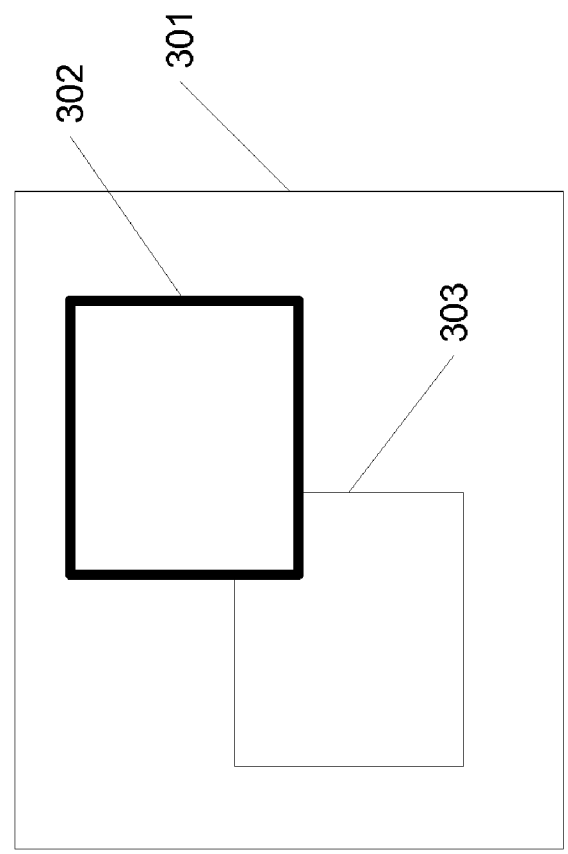

FIGS. 3A and 3B show various techniques of ordering items in an interface. In FIG. 3A, a window 301 includes items 302 and 303. Here, item 302 has focus so it is present in front of item 303. In FIG. 3B, content is arranged in a tree. Here, a root node (referred to as "root") 304 is the node from which all other nodes in the tree are based. Child nodes 305 and 306 are placed in the tree from root node 304. Their relative positions to each other define how they will be rendered, above or below each other. The axis 307 at the left side of FIG. 3B illustrates the "z-order" of the various nodes in this example tree.

Figure 4:
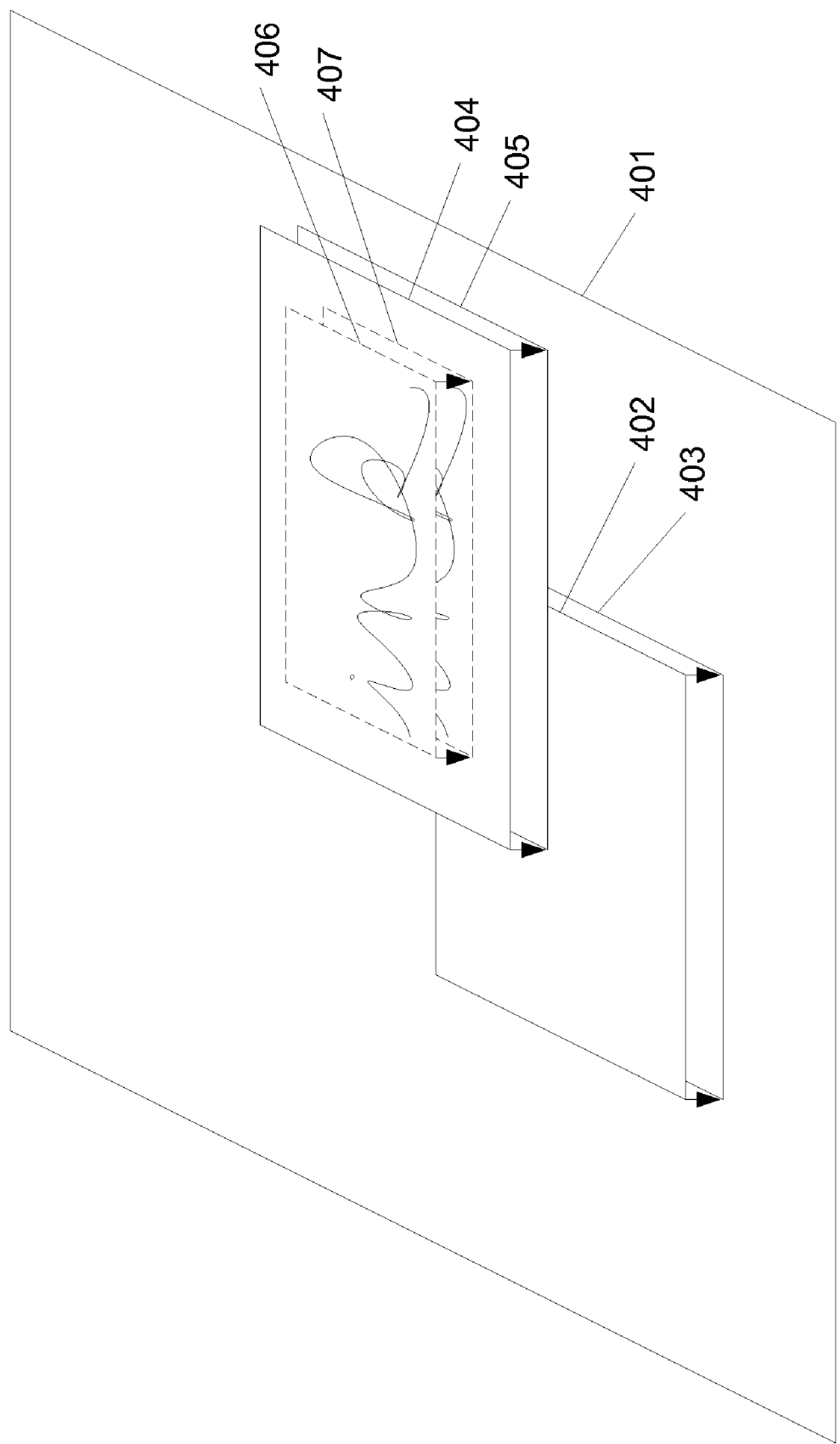
FIG. 4 shows ink applied to a region in accordance with aspects of the present invention.

FIG. 4 shows an example of how ink may be rendered in a system having a z-ordered (or depth ordered) ordering structure. Here, window 401 is shown with content. The content includes content 402 that is rendered at position 403 and content 404 that is rendered at position 405. Once the previous contents 402 and 404 have been rendered, ink 406 may be rendered at position 407 on the top most content (here 404). Ink 406 may or may not always be associated with the top most content 404. For instance, a user may be working with a form 404 that accepts ink information as content 406. Here, the form 404 may be rendered prior to having ink 406 placed upon it.

In an alternative approach, the ink may lie underneath other elements. For instance, ink may be rendered and then elements rendered on top. The rendering of ink may be intermixed with the rendering of the elements.

Constructors, Properties, Methods, and Events of Objects

Figure 5:
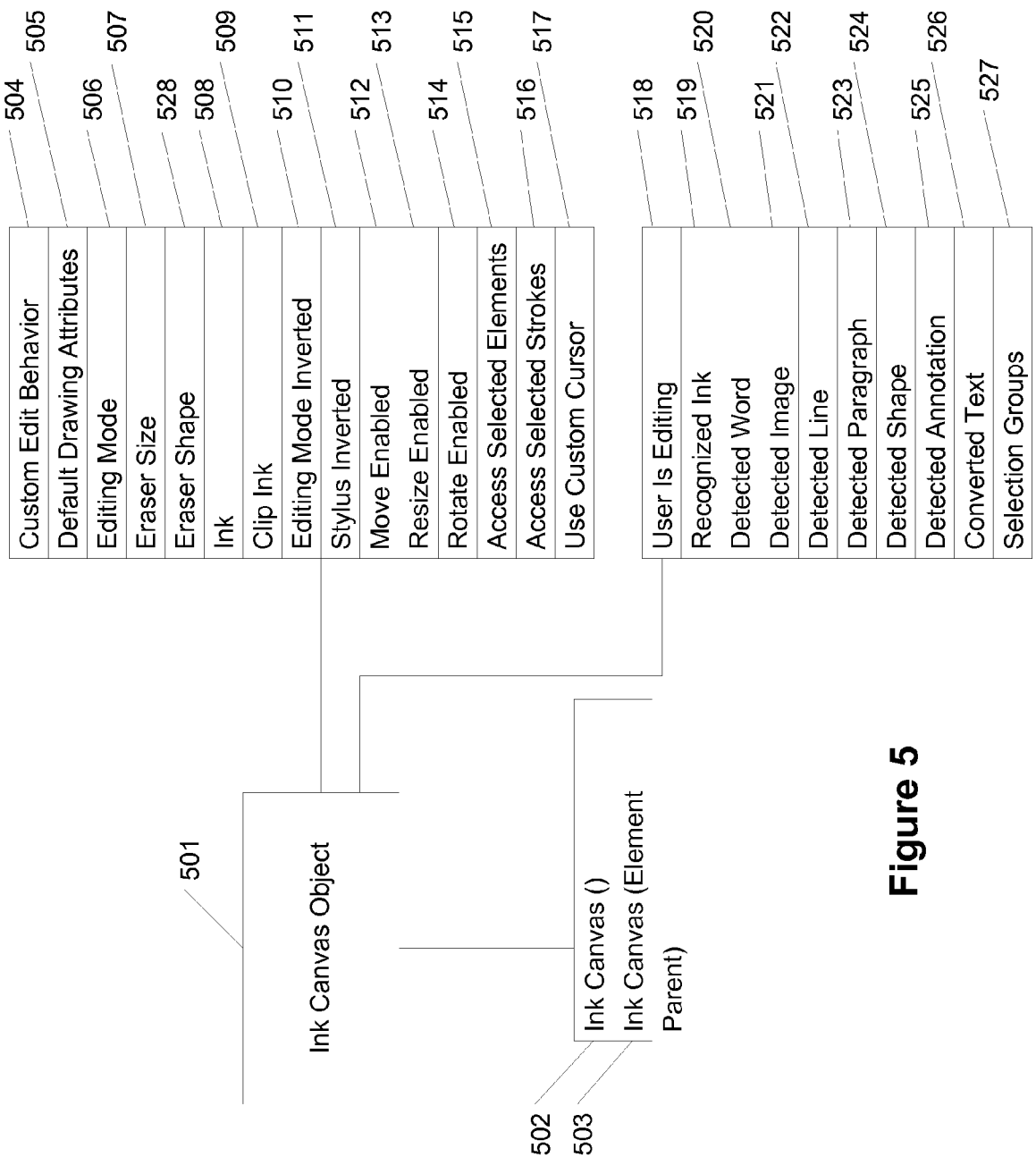
FIG. 5 shows constructors and properties of an object in accordance with aspects of the present invention.
Figure 6:
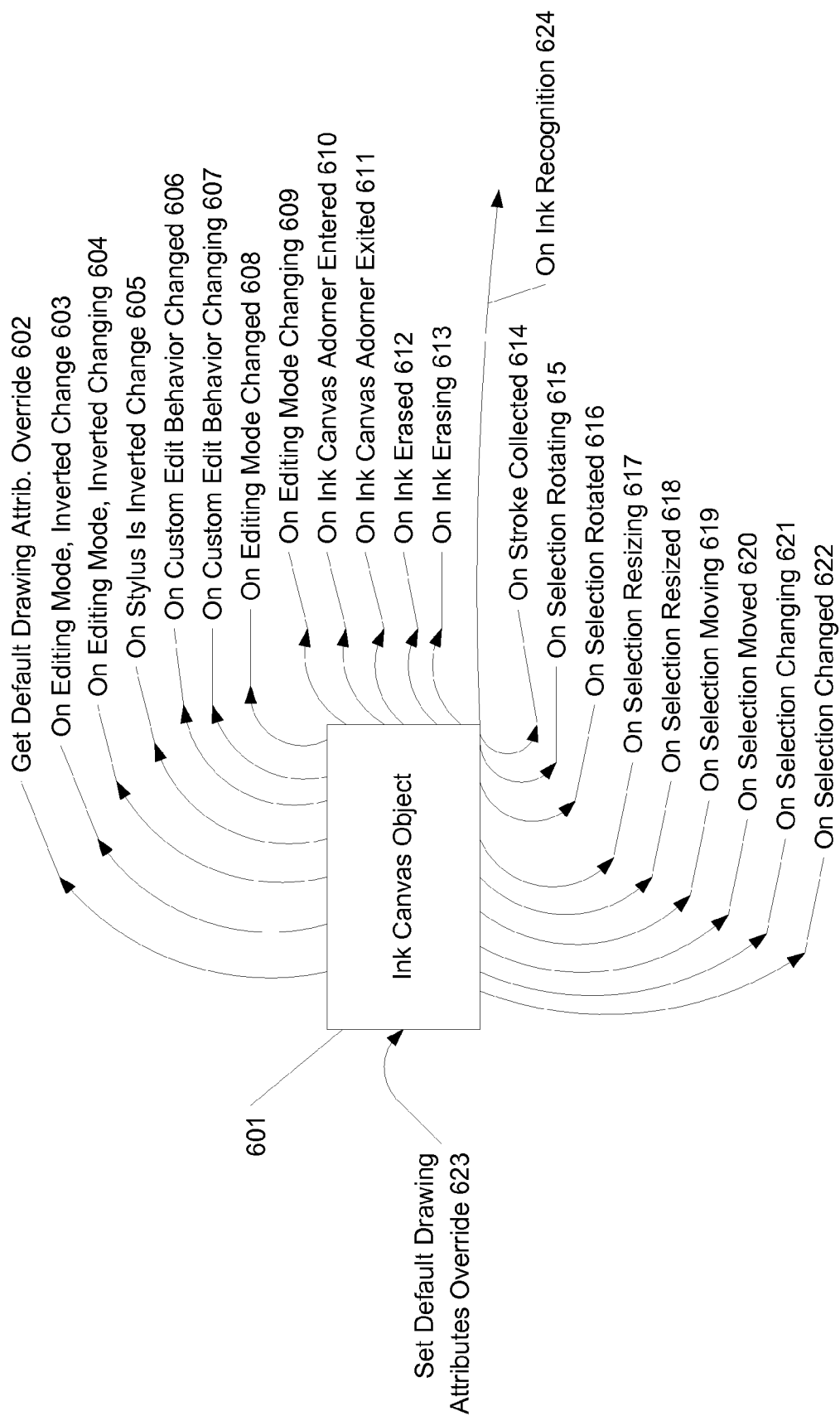
FIG. 6 shows methods of an object in accordance with aspects of the present invention.
Figure 7:
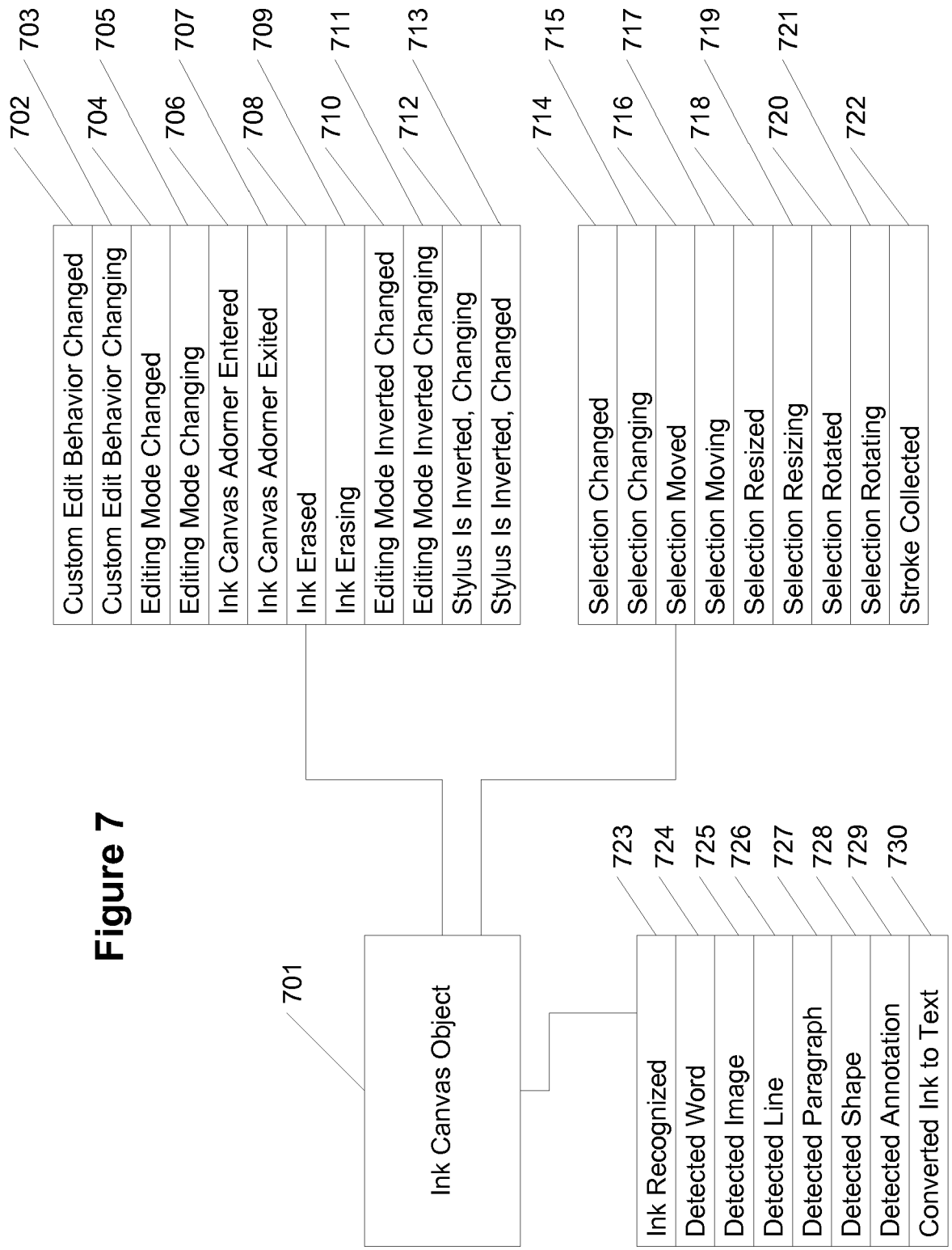
FIG. 7 shows events of an object in accordance with aspects of the present invention.

To control the layering order of content, an object may be used to handle this task. For simplicity, this disclosure refers to an object that may handle this task related to ink as an "ink canvas" object (in that it is functionally similar to how a painter applies paint in layers to a physical canvas). In one example, the ink canvas may be an element. In another example, the ink canvas may be an object (where all elements are objects, but not all objects are elements). For simplicity, the ink canvas is referred to herein as an object. The ink canvas object is shown in FIGS. 5-7 with various constructors, properties, methods and events. It is appreciated that the various constructors, properties, methods and events are shown for illustrative purposes only. Some, all, or additional ones may be present in various forms in other examples of an ink canvas object without departing from this invention. The ink canvas object may host zero or more elements or objects. The ink canvas object may render ink for hosted elements or objects or those elements or objects may render ink for themselves.

The following Figures and description thereof illustrate various examples of methods, properties, events and constructors. It is appreciated that, in some instances, various items may be hidden from outside access, yet accessible by a different mechanism. For instance, a method may be used to return an ink object, selected ink strokes, an ink stream, or an array of bytes. This method may be used in place of accessing a property that may contain this information. Methods may be used to access or set properties, respond to or throw events, and the like. Properties may describe the states of methods and/or events. Events may indicate when properties are set or when methods have been executed. Other examples follow from these but are not listed here.

Various aspects may or may not be present in an ink canvas object. First, an ink canvas object may host elements and/or objects. The elements and objects may be rendered by the ink canvas object or may render themselves. The ink canvas object may be hosted in a tree-based organizational structure. The ink canvas object may be created in a markup language (for instance, HTML, XML, and/or XAML, and the like). The ink canvas object may include recognition functionality (including handwriting recognition, shape recognition, drawing recognition, annotation recognition and the like). The ink canvas object may include extensible editing functionality. Finally, the ink canvas object may include a variety of application programming interfaces that permit a developer to write applications that interact with the ink canvas object. One or more of these aspects may be present in an ink canvas object.

FIG. 5 shows constructors and properties associated with the ink canvas object. The ink canvas object is shown as 501. Two constructors are shown as 502 and 503. Constructor 502 is a public constructor with default collection and rendering capabilities enabled. Constructor 503 creates a new instance of the ink canvas object 501 with a link to a specified parent.

FIG. 5 also shows properties 504-518:
  Custom Edit Behavior property 504 allows one to set a custom edit behavior.
  Default Drawing Attributes property 505 defines drawing attributes for newly collected strokes.
  Editing Mode property 506 sets the current editing mode.
  Eraser Size property 507 sets the size of the eraser when an erasing mode has been enabled.
  Erase Shape property 528 sets the shape (round, oval, square, rectangular, and the like) of the eraser when an erasing mode has been enabled.
  The Ink property 508 allows access to the ink contained in the ink canvas object.
  Clip Ink property 509 determines when ink will be clipped to the size of the ink canvas' displayed region.
  Editing Mode Inverted property 510 indicates which editing mode (or other language or state) will be active when a user's pen is inverted. It is noted that additional pens may be used. Accordingly, additional properties 510 may be used to define other modes to be associated with other pen tips.
  Stylus Inverted property 511 indicates whether the stylus is currently inverted.
  Move Enabled property 512 enables and disables an ability to move created ink.
  Resize Enabled property 513 enables and disables an ability to resize created ink.
  Rotate Enabled property 514 enables and disables an ability to rotate created ink.
  Access Selected Elements property 515 enables access to currently selected elements that are children of a current ink canvas 501.
  Access Selected Strokes property 516 enables access to currently selected strokes that are associated with the current ink canvas 501.
  Use Custom Cursor property 517 indicates that a developer is using a custom mouse cursor and that the current cursor is to be maintained.
  User Is Editing property 518 indicates that the ink canvas 501 is currently collecting ink.
  Selection Groups property 527 indicates which strokes or ink objects are grouped together for group or parser-aware selections and operations.

In addition to the above properties, the ink canvas object 501 may or may not further include one or more ink recognition properties.
  Recognized Ink property 519 indicates that ink has been recognized. The recognition may or may not be associated with a currently selected or previously selected stroke or strokes.
  Detected Word property 520 indicates which set of strokes or ink object has been detected as a word.
  Detected Image property 521 indicates which set of strokes or ink object has been detected as an image.
  Detected Line property 522 indicates which set of strokes or ink object has been detected as a line.
  Detected Paragraph property 523 indicates which set of strokes or ink object has been detected as a paragraph.
  Detected Shape property 524 indicates which set of strokes or ink object has been detected as shape (and/or the type of shape).
  Detected Annotation property 525 indicates which set of strokes or ink object or objects have been detected as an annotation.
  Converted Text property 526 includes text recognized from ink. Alternatively, it may indicate that, for a rendering of one or more ink strokes or objects, converted text is to be used in place of a visible form of the ink.

It is appreciated that the above properties are listed for illustrative purposes only. Other properties may be used in addition to or in place of the above properties with the ink canvas object.

FIG. 6 shows various methods associated with an ink canvas object 601:
  Get Default Drawing Attributes Override method 602 gets the default override settings for a specific stylus. For instance, a user may have one stylus for editing and one for erasing. This method allows one to control the default behavior for a specific stylus.

On Editing Mode, Inverted Change method 603 throws an event that the inverted mode has changed.

On Editing Mode, Inverted Changing method 604 throws an event that the inverted mode is changing.

On Stylus Is Inverted Change method 605 throws an event when a stylus is used to change the inverted editing mode.

On Custom Edit Behavior Changed method 606 throws an event indicating that a custom edit behavior has changed.

On Custom Edit Behavior Changing method 607 throws an event indicating that a custom edit behavior is changing.

On Editing Mode Changed method 608 throws an event indicating that the editing mode has changed.

On Editing Mode Changing method 609 throws an event indicating that the editing mode is changing.

On Ink Canvas Adorner Entered method 610 throws an event when a graphic adorner (a graphical placeholder that may or may not be shown when a user selects ink) for ink is entered.

On Ink Canvas Adorner Exited method 611 throws an event when a graphic adorner for ink is exited.

On Ink Erased method 612 throws an event when ink is erased.

On Ink Erasing method 613 throws an event when ink is in the process of being erased.

On Stroke Collected method 614 throws an event when strokes are collected.

On Selection Rotating method 615 throws an event when a selection is in the process of being rotated.

On Selection Rotated method 616 throws an event when a selection has been rotated.

On Selection Resizing method 617 throws an event when a selection is in the process of being resized.

On Selection Resized method 618 throws an event when a selection has been resized.

On Selection Moving method 619 throws an event when a selection is in the process of being moved.

On Selection Moved method 620 throws an event when a selection has been moved.

On Selection Changing method 621 throws an event when a selection is in the process of being changed.

On Selection Changed method 622 throws an event when a selection has been changed.

Set Default Drawing Attributes Override method 623 overrides the default drawing attributes associated with captured strokes.

In addition to the above methods, the ink canvas object 601 may or may not further include one or more ink recognition methods.

On Ink Recognition method 624 throws one or more events when ink has been recognized.

It is appreciated that the above methods are listed for illustrative purposes only. Other methods may be used in addition to or in place of the above methods with the ink canvas object.

FIG. 7 shows various events that may be associated with the ink canvas object 701:

Custom Edit Behavior Changed event 702 occurs when the custom edit behavior has changed.

Custom Edit Behavior Changing event 703 occurs when the custom edit behavior is about to change.

Editing Mode Changed event 704 occurs when the editing mode has changed.

Editing Mode Changing event 705 occurs when the editing mode is about to change.

Ink Canvas Adorner Entered event 706 occurs when an ink adorner has been entered.

Ink Canvas Adorner Exited event 707 occurs when an ink adorner has been exited.

Ink Erased event 708 occurs when ink has been erased.

Ink Erasing event 709 occurs when ink is about to be erased.

Editing Mode Inverted Changed event 710 occurs when an editing mode related to an inverted pen has changed.

Editing Mode Inverted Changing event 711 occurs when an editing mode relating to an inverted pen is about to change.

Stylus Is Inverted, Changing event 712 occurs when a user is inverting a stylus.

Stylus Is Inverted, Changed event 713 occurs when a user has inverted a stylus.

Selection Changed event 714 occurs when a selection has changed.

Selection Changing event 715 occurs when a selection is about to change.

Selection Moved event 716 occurs when a selection has moved.

Selection Moving event 717 occurs when a selection is about to be moved.

Selection Resized event 718 occurs when a selection has resized.

Selection Resizing event 719 occurs when a selection is about to be resized.

Selection Rotated event 720 occurs when a selection has rotated.

Selection Rotating event 721 occurs when a selection is about to be rotated.

Stroke Collected event 722 occurs when a stroke has been collected.

In addition to the above events, the ink canvas object 701 may or may not further include ink recognition events.

Ink Recognized event 723 occurs when ink has been recognized.

Detected Word event 724 occurs when a word has been detected.

Detected Image event 725 occurs when an inked image has been detected.

Detected Line event 726 occurs when an inked line has been detected.

Detected Paragraph event 727 occurs when an inked paragraph has been detected.

Detected Shape event 728 occurs when an inked shape has been detected.

Detected Annotation event 729 occurs when an ink annotation has been detected.

Converted Ink to Text event 730 occurs when ink has been converted to text.

It is appreciated that the above events are listed for illustrative purposes only. Other events may be used in addition to or in place of the above events with the ink canvas object.

Relationships

Figure 8:
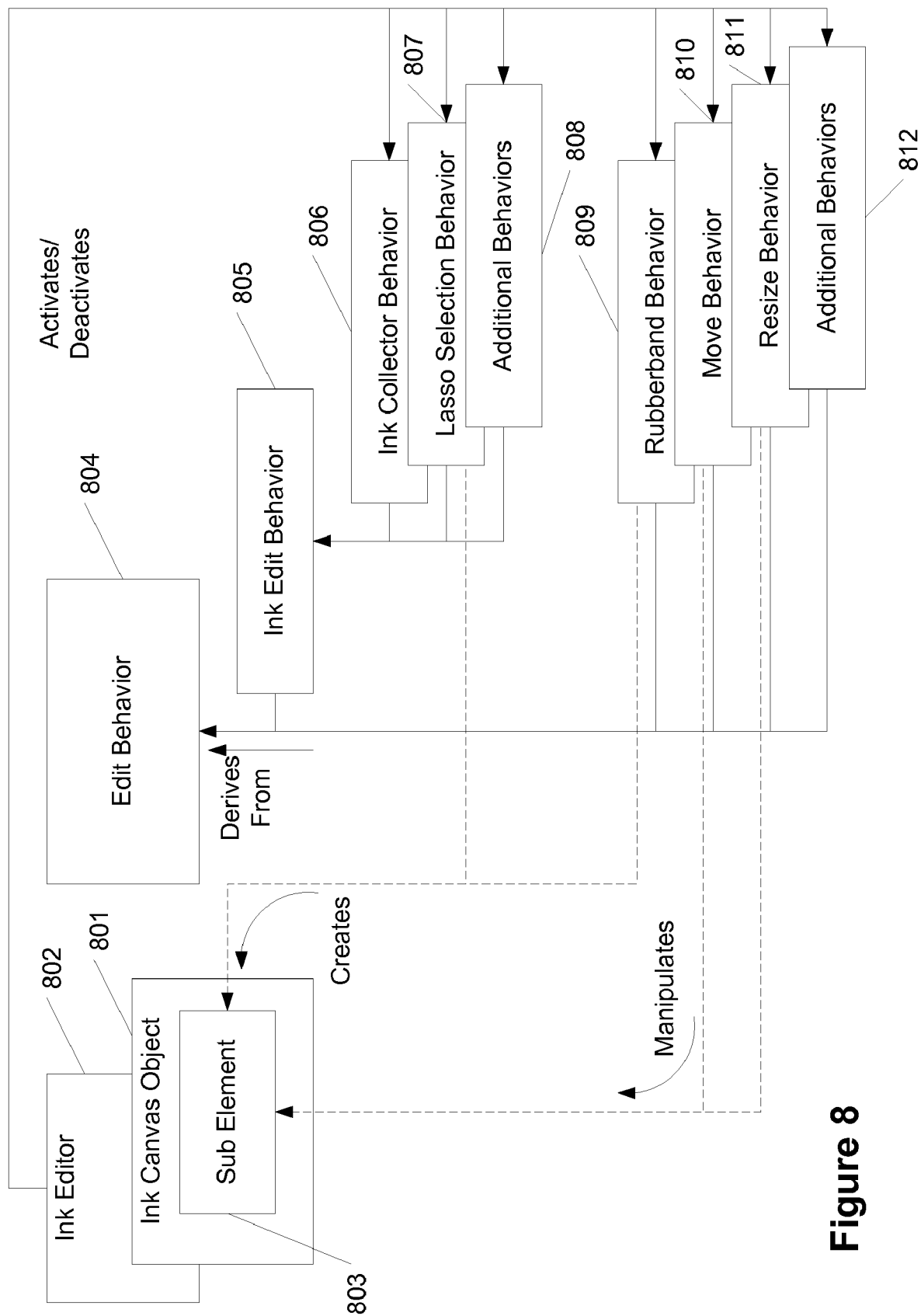
FIG. 8 shows relationships in accordance with objects and various behaviors in accordance with aspects of the present invention.

FIG. 8 shows various illustrative relationships between the ink canvas object, an ink editor, and various behaviors. Ink canvas object 801 includes one or more sub elements 803. Ink canvas object 801 is attached to the ink editor 802 and handles input events (change in focus, keyboard inputs, stylus inputs, and the like). The ink editor 802, among other things, orchestrates activation of componentized edit behavior 804 (including, but not limited to, ink behaviors and non-ink specific behaviors). The ink specific behaviors are collected in the ink edit behavior 805. The ink edit behavior 805 provides base activation/deactivation heuristics (deactivate on pen up, deactivate when the editing mode property changes on the ink canvas object, etc.). The ink edit behaviors 805 include ink collection behaviors 806, selection behaviors 807 (including lasso selection), and additional behaviors 808. The non-ink specific behaviors include rubberband behavior 809, move behavior 810, resize behavior 811, and additional behaviors 812.

The ink editor 802 manages the various behaviors 806-812 as shown by the arrows from the ink editor 802 to each of the behaviors 806-812. The various behaviors 806-812 may be grouped according to relative function. For instance, the creation or selection of a subset of content in sub element 803 may be performed by various selection behaviors including, but not limited to, the lasso selection behavior 807 and the rubberband selection behavior 809. The selected content in sub element 803 may be modified and/or manipulated by various behaviors as well by, for example, the move behavior 810 and resize behavior 811 (among others).

Referring back to the ink canvas object 801, it may be used with no children to have a region where the user can draw. Also, the ink canvas object 801 may be used on top of any other element or object or control, since the ink canvas object 801 may host any other type of element. This allows the developer to easily make anything annotatable or have any background for inking. It is appreciated that ink may be rendered at various levels (intermixed with elements, above, or below elements) in accordance with aspects of the invention.

An example of a code for accessing the ink canvas object may be as follows:

```
<InkCanvas>
    <TextPanel FontSize="12" FontFamily="Arial">
        Ink in XAML will be
            <TextPanel FontWeight="Bold">really</TextPanel>
        cool!
    </TextPanel>
</InkCanvas>
```

Since the InkCanvas can host any other type of element, the ability to ink does not need to be enabled for all other types of panels. The following is another example of a code snippet that allows association between the ink canvas and a flow panel (where the ink will be displayed):

```
<InkCanvas>
    <DockPanel Background="white">
        <FlowPanel Background="#669999" Width="100"
        Height="75"
            Dock="Right">
        <Text>Right</Text>
        </FlowPanel>
            <FlowPanel Background="#669966" Width="100"
            Height="75" Dock="Left">
        <Text>Left</Text>
            </FlowPanel>
    </DockPanel>
</InkCanvas>
```

The following shows the ink object being associated with the element itself It is available as a dynamic property or as a .NET property for convenience:

```
public static readonly DynamicProperty InkProperty =
    PropertyManager.RegisterProperty("Ink", ... );
public System.Windows.Ink.Ink Ink;
```

The following is an example of XAML containing ink using the ink canvas object:

```
<InkCanvas
    Ink="base64:sdfsdfdsf..."
    Factoid="Default"
    TopRecognitionResult="To get her"
    <!-- hook up a gesture event handler -->
    Gesture="HandleGesture"
    Stroke="HandleStroke"
    <!-- set the default ink properties on the collection
    behavior
    -->
    DefaultDrawingAttributes.FitToCurve=true>
    <Image Left="200" Top="75" Source="image.png"
        Alt="alternate text"/>
    <def:Code>
        <![CDATA[
        void OnStroke(Element sender, ClickEventArgs e)
        {
            // Some Code
        }
        void OnGesture(Element sender, ClickEventArgs e)
        {
            // Some Code
        }
        ]]>
    </def:Code>
    "To get her"
</InkCanvas>
```

Various points of the ink canvas object may include one or more of the following:

Any element may be a child of the ink canvas in XAML. The children may be absolutely positioned.

Any dynamic event may have code attached by setting an XML attribute.

Any dynamic property may be initialized by setting an XML attribute.

The ink, which may or may not be a dynamic property, may be serialized as base64 ISF (a format for storing ink) in an XML attribute called "ink."

The body of the tag is the top recognition result string.

Clipping

Figure 9A:
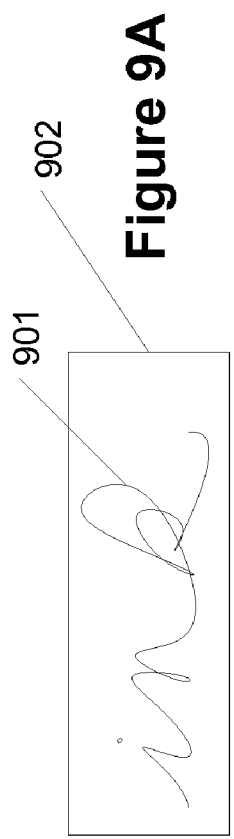
FIGS. 9A, 9B, and 9C show various degrees of ink clipped to a region in accordance with aspects of the present invention.
Figure 9B:
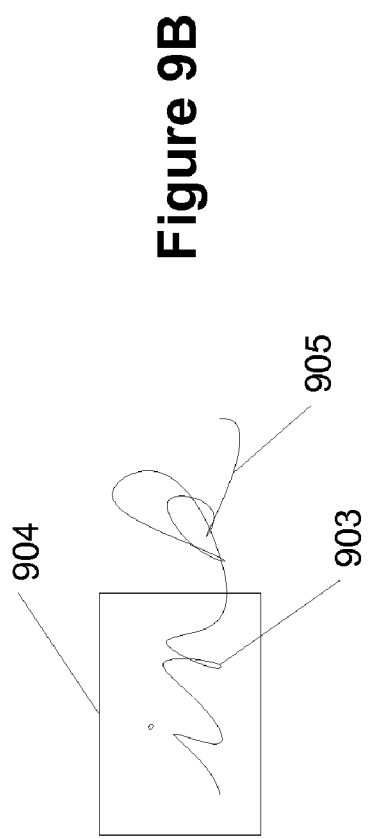
Figure 9C:
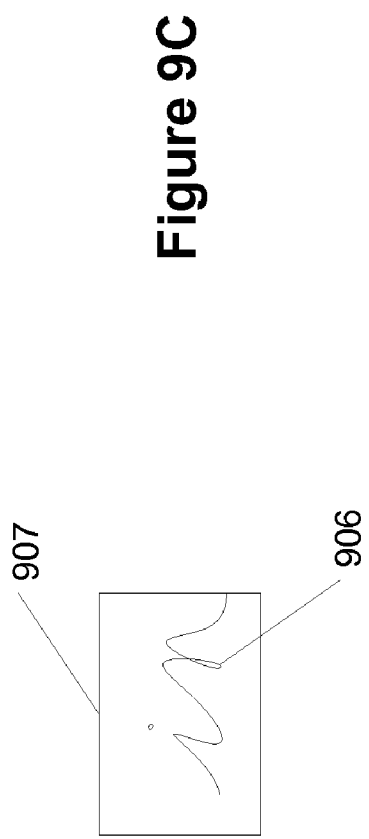

FIGS. 9A, 9B, and 9C show a visual attribute of the ink canvas object. Ink displayed on the ink canvas may or may not be clipped. In one example, the ink canvas object may be automatically resized to prevent the clipping of any content or only ink content. Alternatively, the ink canvas may be set to a size and have the content or only ink content clip. The clipping may be specified by a clip property or a combination of clip properties (for instance, a general content clip and a specific clip property for ink). In FIG. 9A, the entire content of ink 901 is shown in region 902. In FIG. 9B, the entire ink is shown. A first portion 903 of the ink is shown in region 904. The remainder 905 of the ink spills over the end of region 904. Here, ink clipping is off. In FIG. 9C, the ink 906 is clipped to the region 907. Here, clipping is on.

Ink Editor and Ink Editor Behaviors

The editor may use heuristics to determine which edit behavior to activate in response to input events from the computer system. In a number of scenarios, the ink editor does not have heuristics to guide this decision, so it may rely on an attached property (for instance one that specifies the ink editing mode editing mode, which may be a property specified as "InkEditingBehavior.EditingMode" to help disambiguate the user's intentions).

In some cases, such as when the ink editor is in a selection mode (for instance a property as follows:

InkEditingBehavior.EditingMode=Select), heuristics may exist. They may be the same as other editors The edit behaviors that ink editor uses may be generic or may have some aspects that are different from other editor functions. First, the ink editor may or may not detach and revert to another mode on a stylus up or mouse up events. Alternatively, they may remain attached (and functioning) after these events. Remaining attached permits the mode to maintain its cursor and listen for ink gestures (predefined ink movements that are not to be interpreted as ink). Second, they may remove themselves when the editing mode specified changes to a mode they do not support. This detaching may be delayed when engaged in an action associated with a mode (for instance collecting a stroke) until the end of the action (for instance, a stylus or pen up event).

This behavioral contract may be specified by the following abstract base class:

public abstract class InkEditingBehavior: EditBehavior

The following description and drawings describe various elements, objects, and interactions between them. As an illustration of the general references in the description, the Figures may include references to illustrative examples of how one may name objects and related methods and properties. For instance, a method that acts on a selected ink element when a selection changes may be named "SelectedInkElement.OnSelectionChanged".

Figure 10:
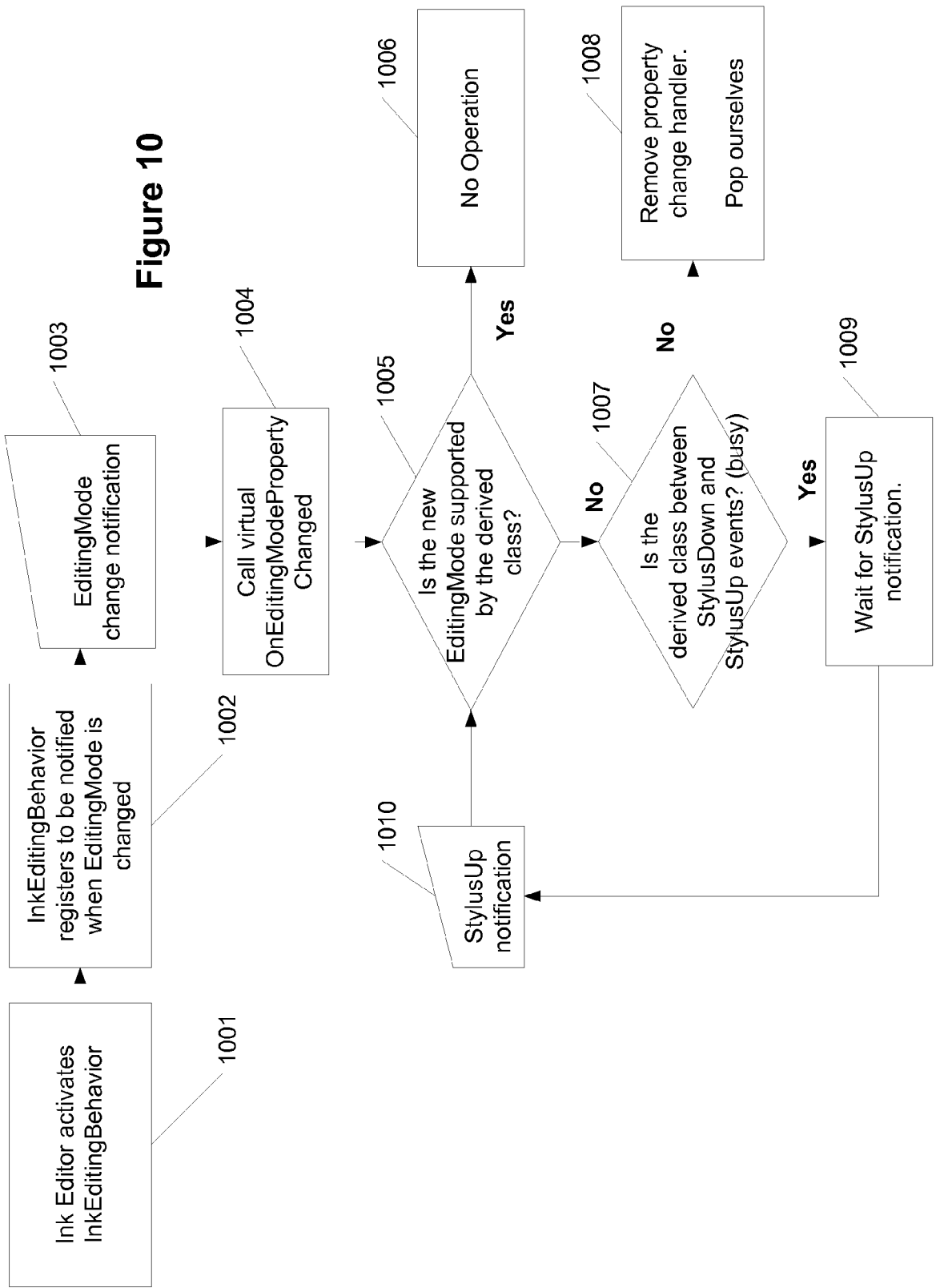
FIG. 10 shows relationships between ink edit behaviors in accordance with aspects of the present invention.

FIG. 10 shows how classes of components inherit behaviors from a parent ink editing behavior. In step 1001, an ink editor (referred to herein as InkEditor) activates an ink editing behavior (referred to herein as InkEditingBehavior). Next, in step 1002, the InkEditingBehavior registers with the system so that it will be notified when the editing mode (the property referred to here as EditingMode) changes. In step 1003, the editing mode changes and a notification is sent to InkEditingBehavior. In step 1004, a virtual processor is called to handle the editing mode changing. Here, it is represented by OnEditingModePropertyChanged to handle the change. In step 1005, the system determines if the new editing mode is supported by the derived class. If yes, then the system performs no operation as reflected in step 1006, as no action is necessary. An example of relevant code may look like the following:

```
if(some condition)
{
    return;
}
//else do some work
```

Alternatively, in step 1007, the system determines whether the derived class is between a pen down and pen up event (the user is still writing). This may be represented by stylus down and stylus up events. If no, then in step 1008, the property change handler is removed and the system deactivates the current ink editing behavior so it will no longer receive input events. If yes, then in step 1009, the system waits for a stylus up notification. In step 1010, the stylus up notification is received and the system steps back to step 1005.

The InkEditingBehavior.EditingMode property has at least four possible values and at least four corresponding EditBehaviors that are activated. The EditBehavior that is activated for each EditingMode value is customizable by setting the corresponding AttachedProperty:

| InkEditingBehavior.EditingMode | Default EditBehavior activated | AttachedProperty override |
|---|---|---|
| EditingMode.Ink | InkCollectionBehavior | InkCollectionBehavior.Service |
| EditingMode.Select | LassoSelectionBehavior | LassoSelectionBehavior.Service |
| EditingMode.Erase | EraserBehavior | EraserBehavior.Service |
| EditingMode.Custom | None | InkEditor.CustomBehavior |

Three examples are provided where various behaviors may or may not be used. First, if one sets the erasing mode to "erase", then the call may appear as follows:

<InkCanvas EditingMode="Erase"/>

Second, a one may set a custom behavior for the same erase. Here, a third party may have written a behavior entitled 'MyEraserBehavior' that inherits from InkEditingBehavior. This call may be expressed as follows:

<InkCanvas EditingMode="Erase" EraserBehavior.Service="MyEraserBehavior"/>

Third, one may set a custom behavior that does not inherit from the existing modes (erase, for example). Here, a third party may have written InsertSpaceBehavior:

<InkCanvas EditingMode="Custom" InkEditor.CustomBehavior="InsertSpaceBehavior"/>

Figure 11A:
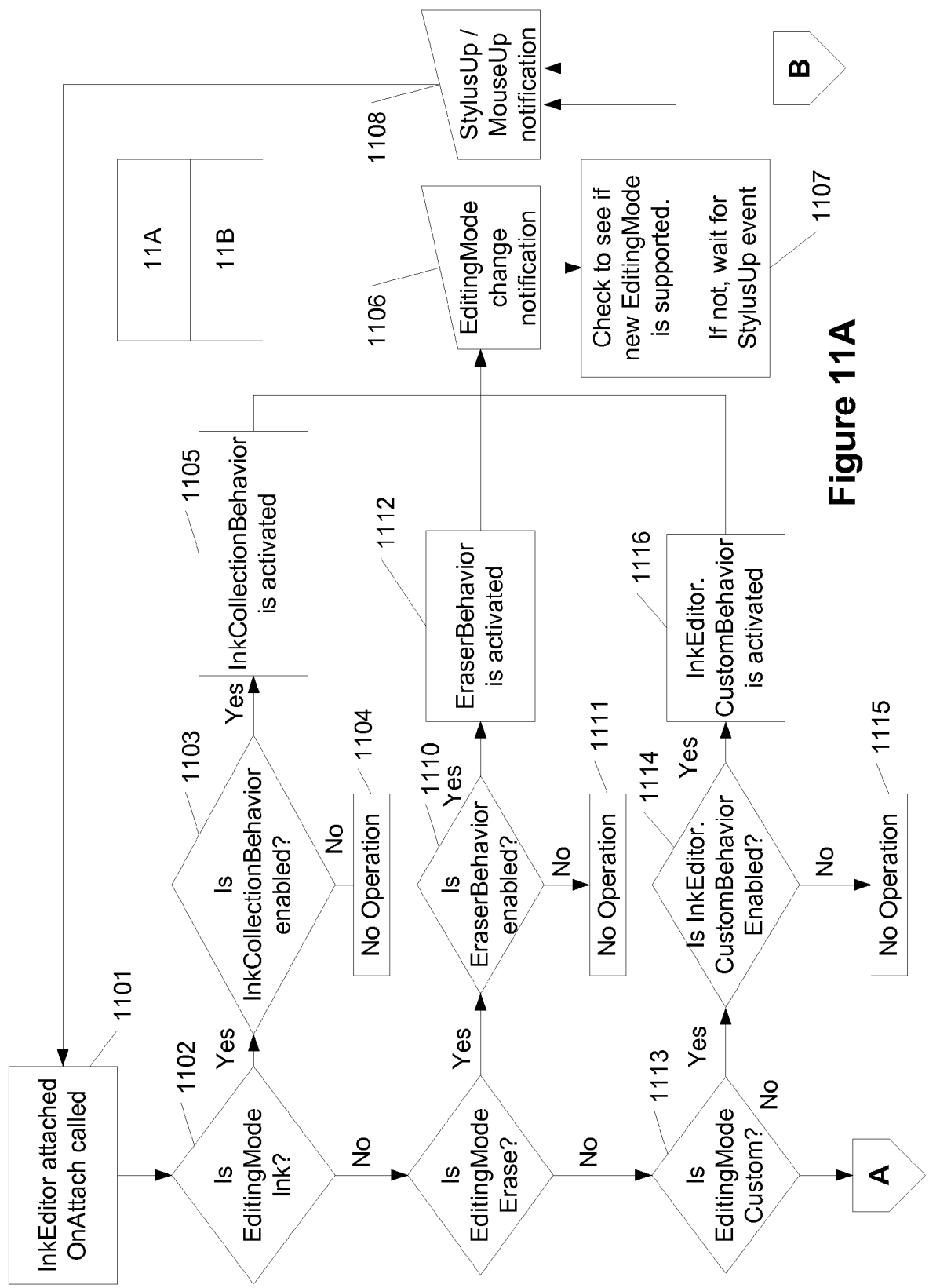
FIGS. 11A and 11B show interaction of an ink editor and various editing modes in accordance with aspects of the present invention.
Figure 11B:
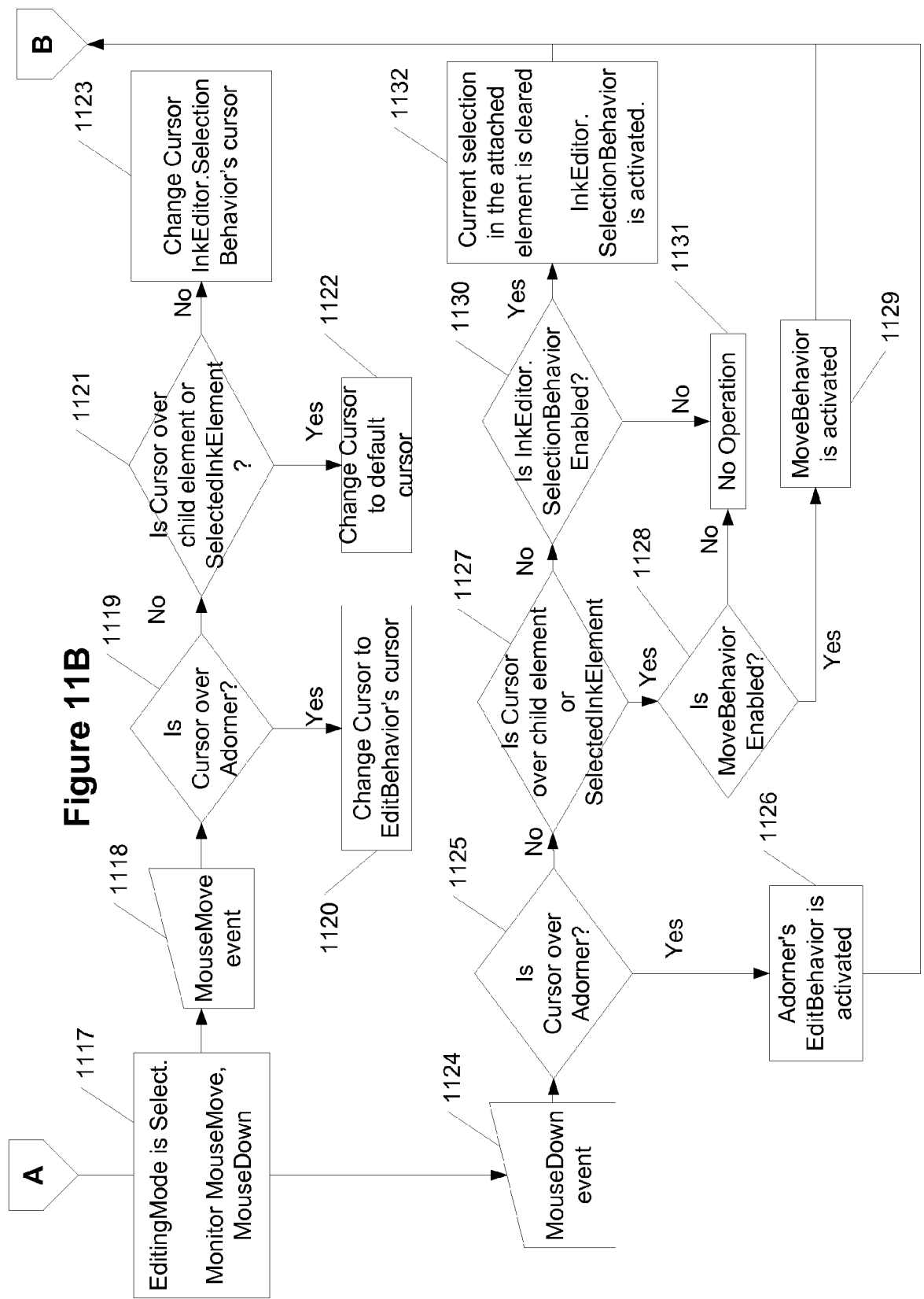

The ink editor may be attached by a selection router during a change in focus event (or on focus event). FIGS. 11A and 11B show this process in greater detail.

In step 1101, the ink editor is attached and an on-attach handler called (OnAttach may be an event that reflects when the ink editor is attached). In step 1102, the system determines if the editing mode is ink. If yes, then the system determines whether an ink collection behavior is enabled in step 1103. If no, then the system performs no operation and no changes are made in step 1104. If yes, then the ink collection behavior is activated in step 1105. Next, an edit mode change notification is provided to a user (through a user interface, for example) in step 1106. In step 1107, the system determines whether the new editing mode is supported. If not, the system waits for a stylus up event. In step 1108, the stylus up (or mouse up) event notification is received and the process returns to step 1101 (with control returned to the ink editor).

If the editing mode from step 1102 was not ink, then the system determines in step 1109 whether the editing mode is an erase mode. If yes, then the system determines whether an erase behavior is enabled in step 1110. If no, then the system performs no operation in step 1111. If yes, then the erasing behavior is activated in step 1112 (control may be transferred as well to the erasing behavior). Next, the system moves to step 1106 as described above.

If no from step 1109, the system determines if the editing mode is a custom editing mode in step 1113. If yes, then the system determines whether the custom editing mode is enabled in step 1114. If no, then the system performs no operation in step 1115. If yes, the custom behavior is activated for the ink editor in step 1116 (control may be transferred to the custom behavior as well). Next, the system sends the editing mode change notification in step 1106.

If no from step 1113, the editing mode is set to a selection mode in step 1117 (in FIG. 11B). Here, the system may monitor for a stylus down/mouse down or stylus move/mouse move event. If the user performs a mouse down/stylus move event in step 1118, then the system determines whether a cursor is located over an adorner in step 1119. If yes, then the cursor is changed to an edit behavior's cursor in step 1120. If no from step 1119, then the system determines in step 1121 whether the cursor is over a child element or a selected ink element. If yes, then the cursor is changed to a default cursor in step 1122. If no from step 1121, then the cursor is changed to a cursor associated with the ink editor's selection behavior cursor.

From step 1117, if a mouse down/stylus down event was received in step 1124, then the system determines whether the cursor is over an adorner in step 1125. If yes, an edit behavior associated with the adorner is activated. Control may also be transferred to this edit behavior. The system then performs based on the adorner edit behavior until a stylus up/mouse up event is received in step 1108.

If no from step 1125, then the system determines (in step 1127) whether the cursor is over a child element or over a selected ink element. If yes, then, if a move behavior is enabled (step 1128), then a move behavior is activated (and control may be passed to it) in step 1129. The move behavior continues until a mouse or stylus up event is received in step 1108.

If a move behavior is not enabled as determined by step 1128, the system performs no operation as shown in step 1131.

If no from step 1127, then the system determines whether an ink editor selection behavior is enabled in step 1130. If no, then the system performs no operation state in step 1131. If yes from step 1130, then the current selection in the attached element is cleared and the ink editor selection behavior is activated in step 1132. Control may also be passed to the ink edit selection behavior of step 1132. The selection behavior continues until a mouse or stylus up event is received in step 1108.

Using the process of FIGS. 11A and 11B, one may change various editing modes, for instance. If there is an active edit behavior (active between the stylus down event, stylus move, and stylus up sequence of events), the system may deactivate it until the stylus up event. In this regards, a current edit behavior may continue functioning until removed by a complete sequence of events.

The edit behaviors described above for ink, erase, and custom may or may not inherit their characteristics from the ink edit behavior control.

Erasing Ink

The EraserBehavior may listen to the pointer or stylus events. If listening to just the pointer events, it will receive the pointer's current location. If listening to the pen events, it may also receive the pen's angle, pressure, and other information. As erasing may be pressure and angle insensitive, listening to the pen events may be excessive. Accordingly, in one aspect, one may limit listening to only pointer information.

Some aspects of the invention relate to point erasing. Point erasing is a dynamic real-time ink editing process that involves building the contour of a moving erasing shape (eraser), hit-testing that contour against specified ink strokes, and splitting or clipping the hit strokes at the areas crossed by the eraser.

In one aspect of point erasing is a hit-testing approach that that finds the areas on an ink stroke contour hit by the eraser and determines the points where the stroke should be split or clipped for dynamic feedback. The points of splitting/clipping are found such that there's no or minimal space between the erasing contour and the resulting ink, that gives the user an experience of smooth and precise point erasing.

Point erasing supports erasing of ink strokes rendered with round and rectangular stylus shapes, with variable as well as constant pressure. It provides a significant WYSIWYG experience by taking into account ink rendering transformations.

The eraser is pressure-insensitive and can have either round or rectangular shape.

Selection Modes

Various selection modes are possible including a lasso selection (in which the path of a pen determines which elements are encompassed in the selection. Here, the selection modes may listen to the pointer or stylus events. If listening to just the pointer events, it will receive the pointer's current location. If listening to the pen events, it may also receive the pen's angle, pressure, and other information. As selection modes may be pressure and angle insensitive, listening to the pen events may be excessive. Accordingly, in one aspect, one may limit listening to only pointer information.

Sub-Element Editing

Ink strokes may be grouped into ink objects. Strokes may be stored in a variety of formats. If one needed to move, delete, or resize an ink object, these operations may be limited by the characteristics of the actual combinations of strokes in the ink object, making predictability of what will happen based on these operations impossible.

Accordingly, in some aspects of the invention, one may be able to manipulate smaller parts of the ink strokes then an entire ink stroke. In some aspects, one may relate a sub-element to a designer. The designer may be used to make changes in the element's content. The sub-element designer translates instructions from the system into changes in the element's content. For example, move instructions may tell the sub-element's associated designer to perform a move operation. The sub-element's designer translates those instructions into changes to the content (in this case, moving the selected ink strokes or portions of ink strokes).

Figure 12:
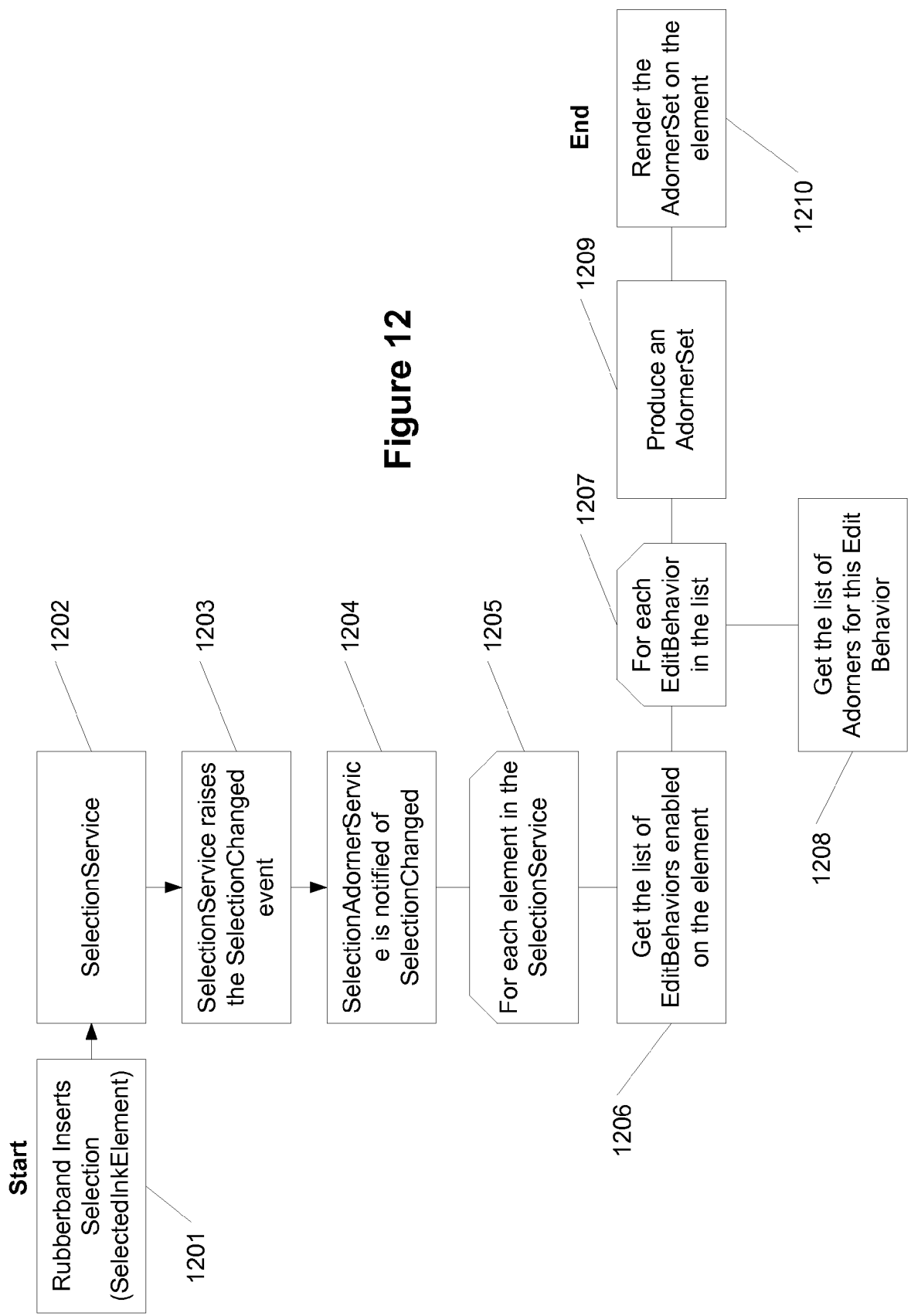
FIG. 12 shows how adorners may be handled based on selection in accordance with aspects of the present invention.

An example of how one may perform sub-element editing is described below and with reference to FIG. 12. Prior to the process of FIG. 12, one deposits ink. For example, one may have a form with an ink canvas on it. The editing mode was ink and the ink collection behavior was used to draw ink. Next, the ink editing behavior's editing mode may be switched to a selection mode. When the pen goes down and drags across the screen, a rubber band behavior is pushed on the edit router by the ink editor and assumes control as shown in step 1201. The rubber band behavior responds to pointer move (or pen move) messages from the edit router by drawing feedback for the user (for instance, a rubber band around the ink).

Next, a pointer up or pen up event occurs. The area that is highlighted is inspected by the rubber band behavior in step 1201. It may perform a hit-test operation (to see what elements or objects are encountered or at least partially encompassed by the rubber band. It hit-tests using the designer of the element for which it is enabled. The hit-test may be a method associated with the designer. In this case, the designer for the ink canvas then inspects the ink canvas for any ink strokes in the hit-test region. If one or more exists, the designer creates a selected ink element and returns it to the rubber band behavior, which in turn inserts it into the service handling selection in step 1202.

Next, when the selected ink is constructed, it is passed the collection of strokes in the collection of ink (that which the selection was performed on). The ink canvas presenter or renderer is informed to listen to the selection service's selection changed event in step 1203 so that the ink canvas presenter knows which strokes not to render.

Now, the rubber band behavior references a single selected ink group, returned from a hit test method from the ink canvas' designer. The rubber band behavior informs the selection service about the ink and deactivates itself in step 1204. Control may be returned to the ink editor.

Other services may also be notified of the change. Here, a selection adorner service may have received a notification from the selection service that the global selection has changed. In response, the selection adorner service may inspect the collection of elements in the selection service and find the single selected ink in the selection. Next, the selection adorner service determines for each element in the selection service in step 1205 which edit behavior are enabled on the selected ink (for instance, move, resize, rotate, and the like) in step 1206. It may then ask each of the enabled edit behaviors in step 1207 what their adorners are and create a set of the adorners in step 1209. The set of adorners may then be rendered on the element in step 1210. It may also get a list in step 1208 of the adorners enabled on each element in the edit behavior list of step 1207.

The ink editor may still be in control. It may listen to pointer move and pointer down events. When a pointer move event occurs, it determines if the pointer is over an adorner. If it is, it asks the adorner for its cursor and changes the cursor to it.

If the pointer down event happens on one of these adorners, the corresponding edit behavior is activated. In this case, the resize behavior becomes active. It responds to that activation by determining the designer of the element it is attached to.

In pointer move events, the resize behavior responds by calling methods on the designer of the element (methods like extend right and extend bottom).

The selected ink's designer may override these virtual extend XXX methods to track the actions being taken. It may respond by scaling the ink to the new area. The selected ink's designer may be aware of various instructions including resizing. Move and rotate instructions may simply be acted on the ink.

The selected ink has been manipulated and has now been de-selected. When the selected ink was constructed, one of the things it did was to ask the selection service to notify it when the selection has changed. The selected ink responds to this notification by fixing up the strokes with the change that has occurred during editing (scaling, rotation, resize).

To determine whether an object is included within a selection region (determined by rubberbanding or by a lasso selection), one may provide a volume threshold of an object that is to be within a selection region for the object to be selected. Ink and other objects may have the same threshold. Alternatively, ink and other objects may have different thresholds. For instance, for arbitrary objects one may set the threshold between 50% and 70% and for ink one may set the threshold between 70% and 90%. Of course, these ranges are for illustrative purposes only. They may differ based on user/developer experiences or desires.

To determine the volume of an object enclosed by a selection, the object may be filled with ordered points or random points. The ratio between those points contained within the selection region may be compared with the total number of points, yielding a percentage of inclusion. If the percentage of inclusion falls within the ranges set forth above (or as modified), the object or ink may be the to fall within the selection region. Optionally, to minimize the delay for large objects and increase the accuracy for small objects, the number of points placed inside the objects may vary based on size. For instance, for small objects, the density of points may be high. For large objects the density of points may be low. Or, alternatively, the densities may be the same for all objects.

Figure 15:
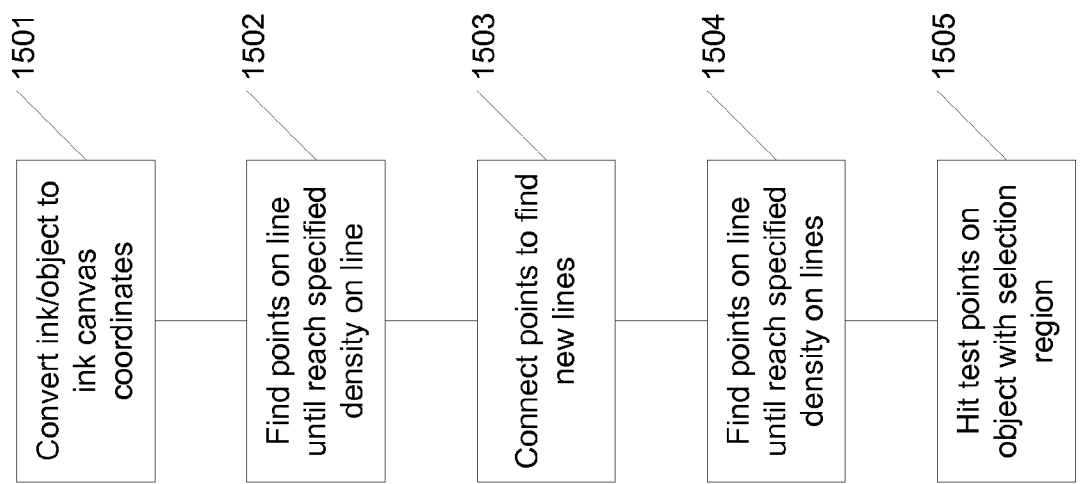
FIG. 15 shows a process for determining overlap of regions in accordance with aspects of the present invention.

The following lists process steps that may be used to determine whether a region is included. Referring to FIG. 15, in step 1501, the coordinates of the ink or object is converted to ink canvas coordinates. In step 1502, points are found and placed on a line within or bounding the object (for instance, a bounding box of the object may be used or the contour of the object used). In step 1503, points may be connected to form additional lines. In step 1504, additional points may be placed on the lines until a desired density is reached. In step 1505, the set of points is hit tested against a selection region to determine which ink or objects fall within the selection region or meet the threshold levels previously set.

Figure 16:
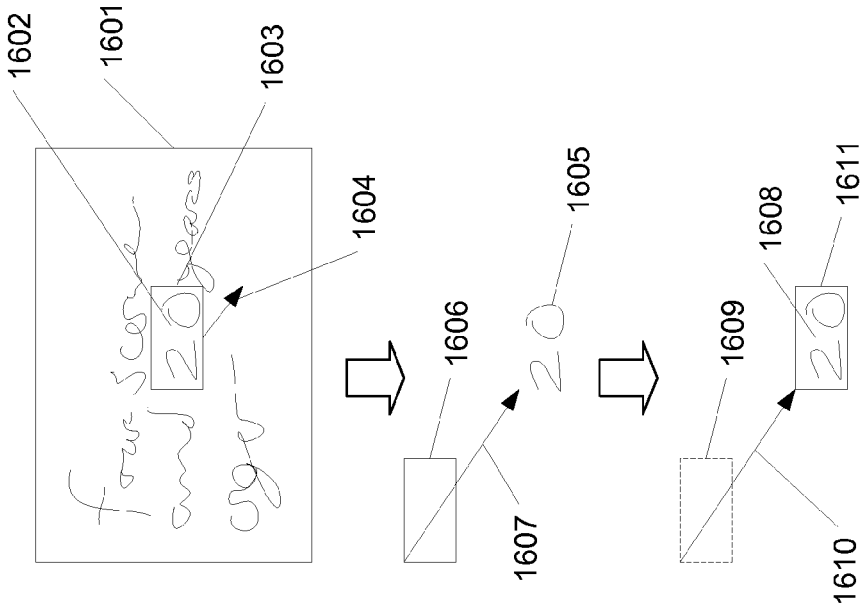
FIG. 16 shows a process for creating a new ink canvas for performing sub-element processing in accordance with aspects of the present invention.

FIG. 16 shows an illustration of how sub-element processing may be used to manipulate sub-elements. FIG. 16 is applied it ink. Sub-element processing may also be applied to other objects as well. FIG. 16 shows an ink canvas 1601 with a number of ink strokes in it. The ink strokes may or may not be grouped as ink objects. Here, a user wants to move the ink "20" 1602, defined by rectangle 1603 a little bit down and right as shown by vector 1604. While the selection here is shown as a rectangle 1603, it is appreciated that other selection mechanisms are also possible including lasso selection. In this example, the ink "20" is part of a larger ink object. Moving the ink object that contains the ink "20" is not what the user desires. Sub-element editing permits the movement of something smaller than the ink object. It is appreciated that items larger than an ink object may be moved as well with this technique.

Sub-element editing as applied to ink starts by determining the bounding box for the selected ink strokes. Another ink canvas 1606 is created. Here, it may be created in the size of the bounding box surrounding ink 1605. The selected ink strokes "20" 1605 are copied (or moved) into the new ink canvas 1606. The location of ink 1605 is determined by a coordinate system of the ink canvas 1601. With the new ink canvas 1606, the identifying information of ink "20" 1605 is the same, it's relation in the new ink canvas 1606 is that same as that in ink canvas 1601. In other words, ink "20" 1605 is offset from the origin of the ink canvas coordinate system by vector 1607. Here, ink canvas 1606 may be repositioned and ink 1605 be moved as well (as it resides now in ink canvas 1606). However, the location of the canvas 1606 and ink 1605 are separated from each other, thereby leading to possible confusion in trying to manipulate or select ink 1605.

To address this potential for confusion, vector 1607 is then applied as an offset 1610 to the ink canvas 1609 so that it shows ink 1608 within its borders 1611.

Renderer Integration

The following describes how the selected ink control knows which strokes to render. The selected ink is passed a strokes collection when instantiated. A presenter associated with the selected ink control knows how to render the strokes. The issue is determining which strokes not to render. The presenter associated with the ink canvas checks the selection service to determine if selected ink associated with the ink canvas is in the current selection. If it is, the presenter accesses the selected ink's strokes property to determine the strokes not to render. Optionally, the presenter may only listen to the selection service when selected ink is about to be inserted. This may occur based on method that instructs the presenter to limit to what it listens. For instance, one may use a method similar to InkCanvasPresenter.WatchSelection.

To demonstrate this, consider the fact that there are two ways to cause ink to be selected. First, a user may manually select strokes using a lasso selection behavior or a rubberband behavior. Second, a developer may programmatically set the selection in the ink canvas. The selection may be set as a property in the ink canvas.

The net effect is the same: selected ink is created and inserted into the selection service. Before insertion, one may optionally tell the ink canvas presenter to listen for a change event (for instance, the selection service having been changed using a watch selection method). If, however, when the ink canvas presenter receives the selection changed event and no selected ink is present in the selection, it may deactivate itself from the selection changed event.

Figure 13A:
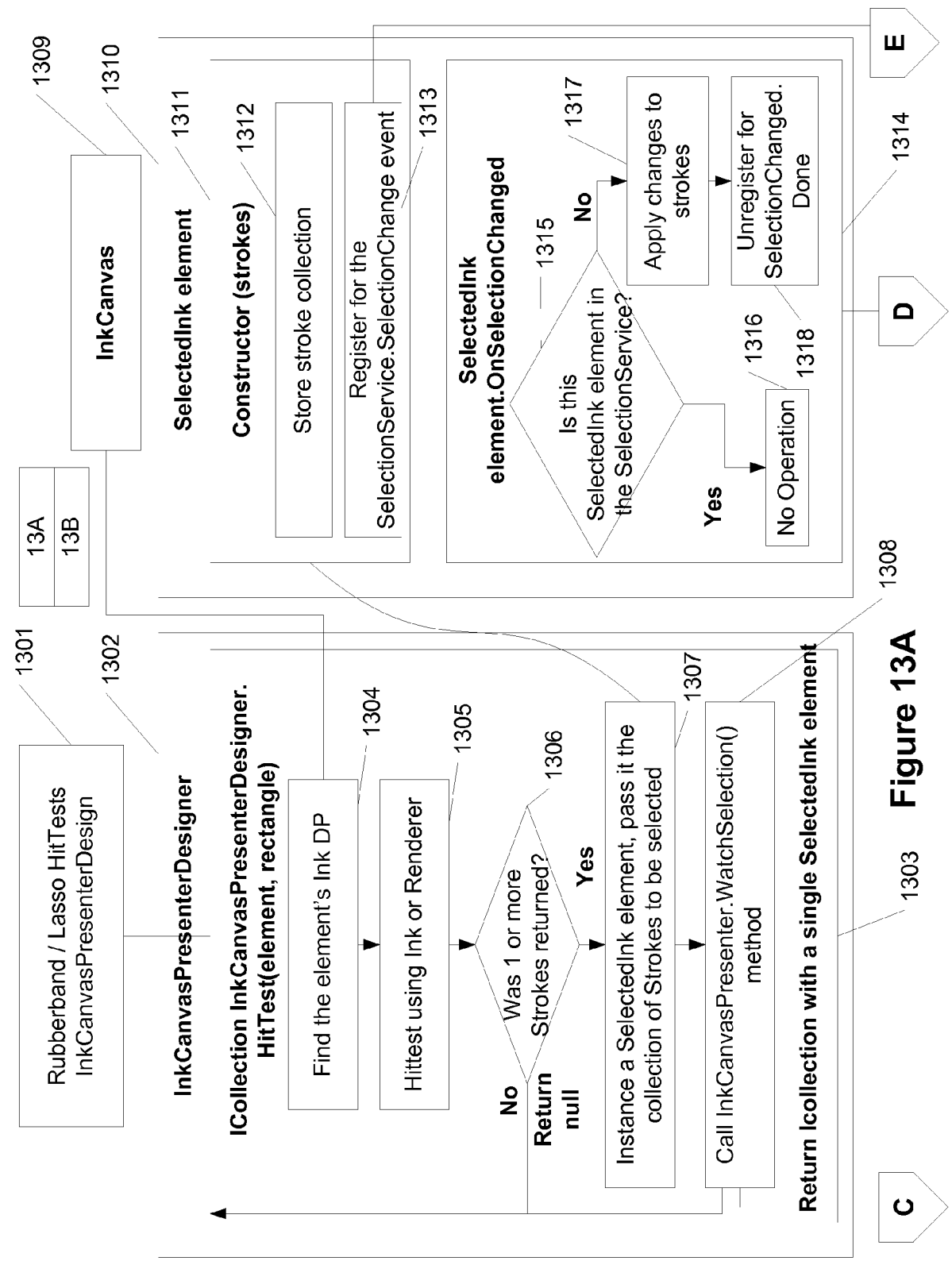
FIGS. 13A and 13B show how ink strokes are handled when a user manually selects strokes in accordance with aspects of the present invention.
Figure 13B:
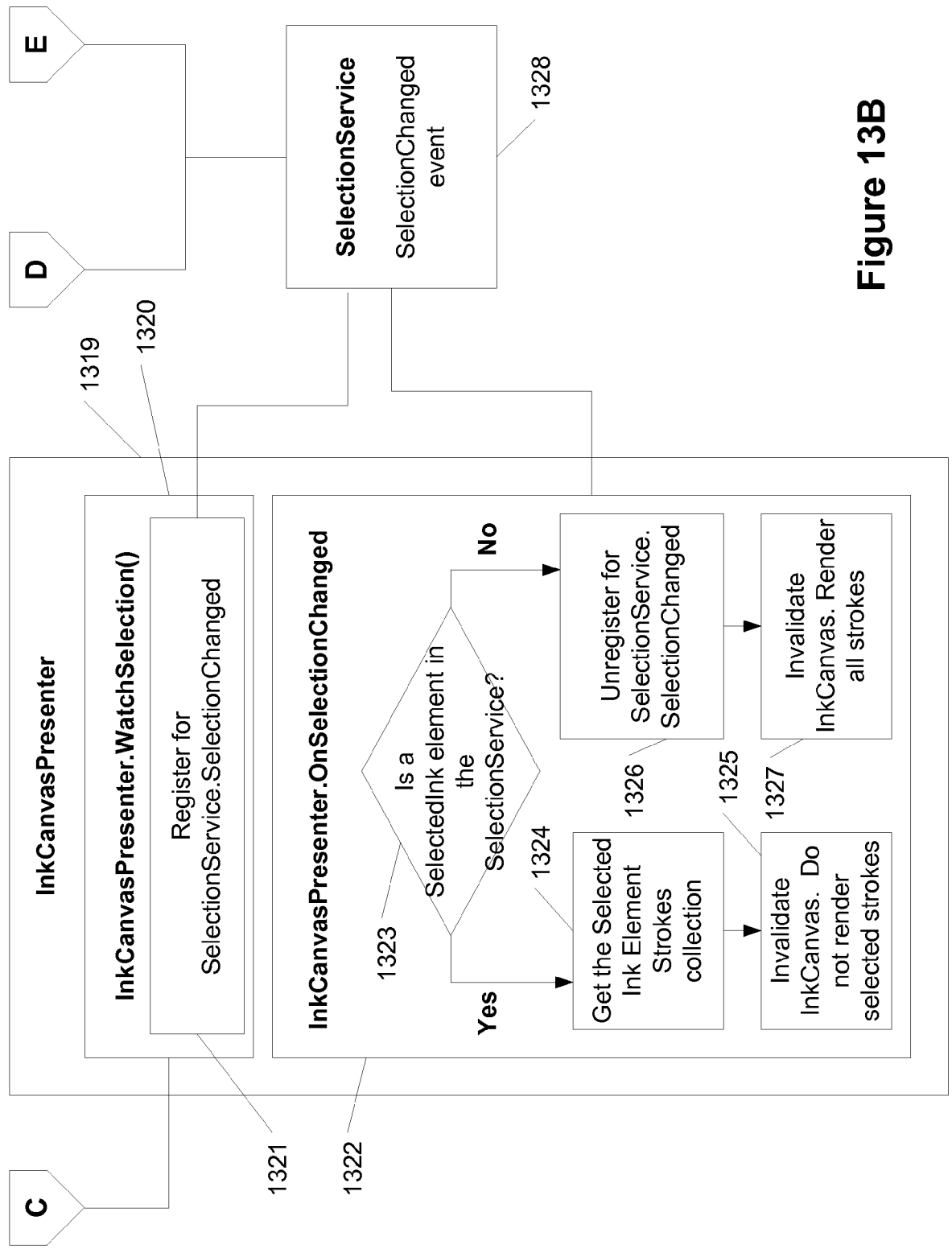

FIGS. 13A and 13B show what may happen when a user manually selects strokes using a lasso or rubber band selection behavior. First, the rubberband/lasso select hit tests in step 1301 the ink canvas presenter designer 1302. In the ink canvas presenter designer 1302 is a method 1303 that performs a hit test on the collection. The title, for illustrative purposes is ICollection InkCanvas PresenterDesigner HitTest. The parameters passed to the method may include the elements and rectangle from the selection. In step 1304, the system finds the element's data points from ink canvas 1309. In step 1305, the system may hit test using information in ink or the renderer. In step 1306, the system determines if one or more strokes were returned. If no, then null is returned and the system performs no operation. If at least one stroke was returned, then an instance of selected ink element is instantiated and a collection of strokes to be selected is passed to it in step 1307. Next, an ink canvas presenter watch selection method is called in step 1308. Finally, the ink collection is returned with a single selected ink element.

From step 1307, the selected ink element 1310 is instantiated. It includes a constructor (having strokes) and a method 1314 that operates when the selection is changed for ink. Its name may be selectedinkelement.onselectionchanged.

Constructor 1311 performs the following: it stores a stroke collection 1312 and registers for the selection service, selection change event 1328 in step 1313.

When the selection has been changed, the system determines whether the selected ink element is in the selection service in step 1315. If yes, the system performs no operation in step 1316. If not, then the system applies changes to the strokes in step 1317. In step 1318, the selected ink element unregisters from listening to the selection change event 1328.

Referring to FIG. 13B, ink canvas presenter 1319 contains a method ink canvas presenter watch selection 1320. The method 1320 may be registered 1321 for a selection service, selection changed event 1328. The ink canvas presenter 1319 may also contain a method ink canvas presenter on-selected changed event 1322 that operates in response to the selection service changed event 1328. In step 1323, the system determines whether there is a selected ink element in the selection service. If yes, then the system gets the stroke collection in step 1324. In step 1325, the system invalidates ink canvas and does not render the selected strokes. If no, from step 1323, then the system unregisters from the selection service, selection changed event in step 1326. Next, in step 1327, the system invalidates the ink canvas and renders all strokes.

Figure 14A:
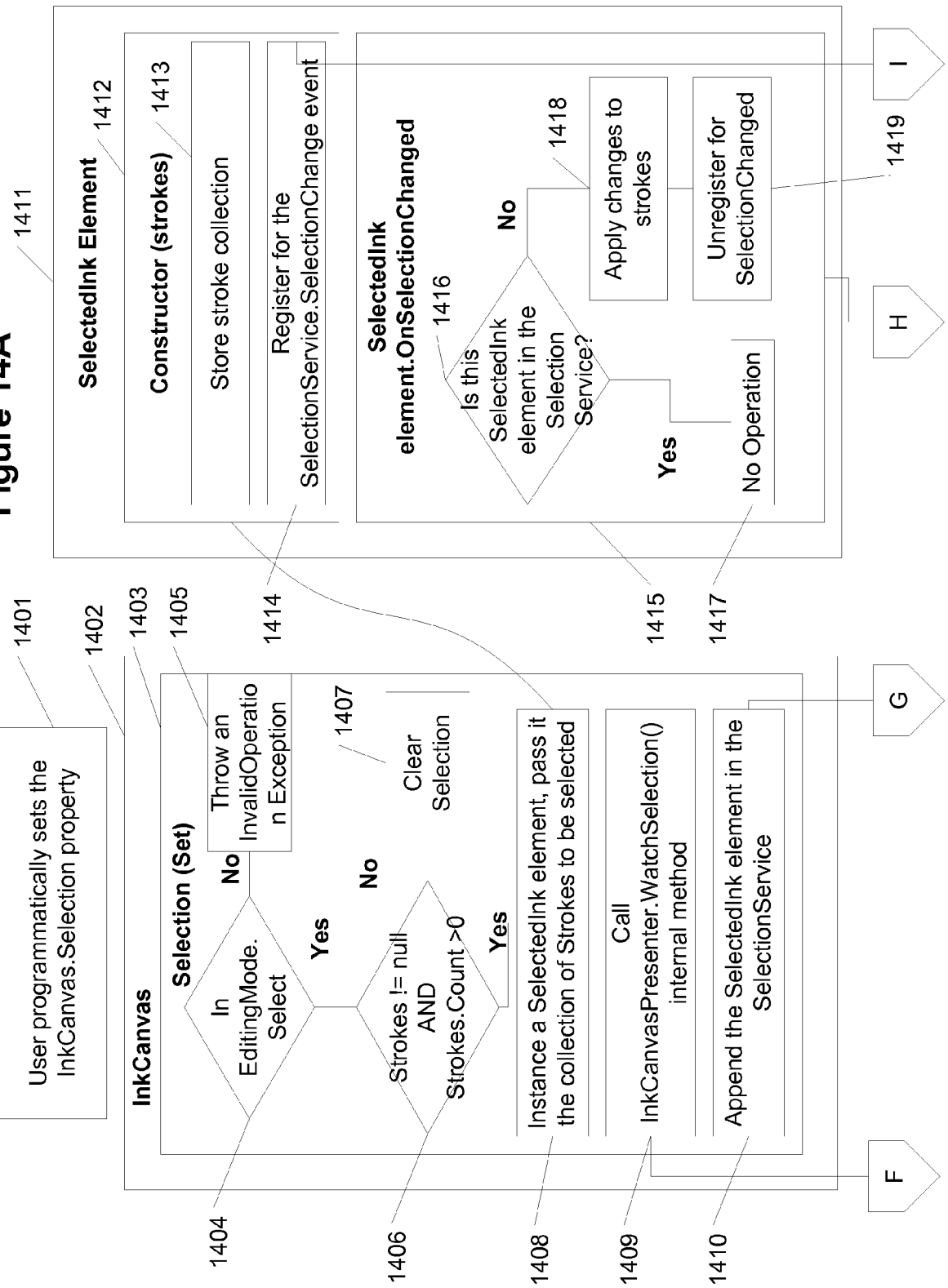
FIGS. 14A and 14B show how ink strokes are handled when strokes are selected programmatically in accordance with aspects of the present invention.
Figure 14B:
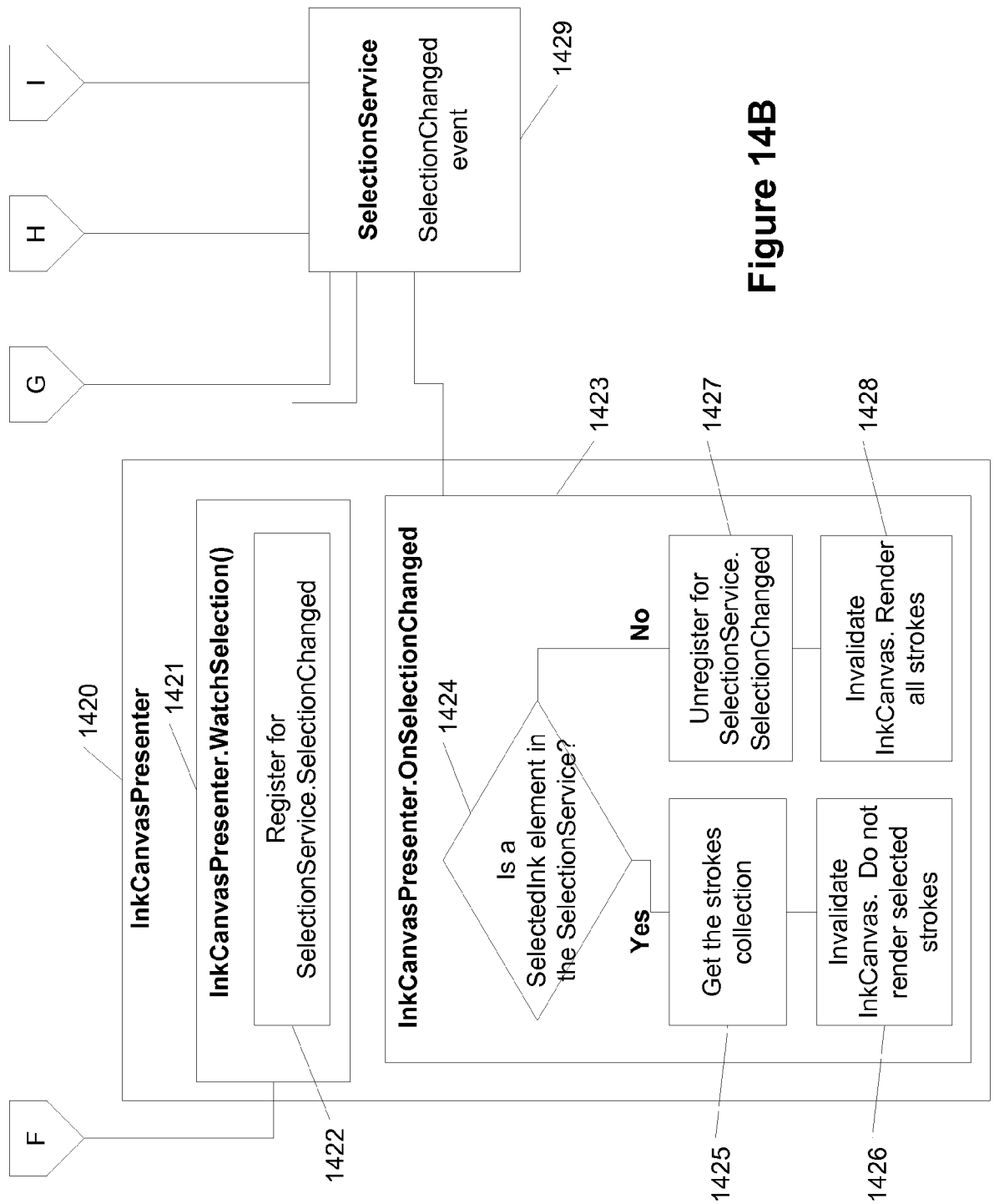

FIGS. 14A and 14B show a programmatically initiated selection. A user or developer programmatically sets the ink canvas selection property in step 1401. An ink canvas 1402 contains a selection (which is being used to set the identity of the collection) 1403. In step 1404, the system determines if it is in the selection editing mode. If no, then it throws an invalid operation exception in step 1405. If yes, then the system determines in step 1406 if the strokes are not equal to null and the count of strokes is greater than zero. If no, then the selection is cleared in step 1407. If yes, then an instance of a selected ink element is created and it is passed the collection of strokes to be selected in step 1408.

Selected ink element 1411 is instantiated containing a constructor (relating to strokes) 1412. The constructor stores a stroke collection 1413 and registers for a selection service selection change event 1429.

The selected ink element also contains method (selected ink, on selection changed) 1415. In step 1416, the system determines if the selected ink element is in the selection service? If yes, then the system performs no operation in step 1417. If no from step 1416, the system applies changes to the strokes in step 1418 and unregisters from selection changed notifications 1429 in step 1419.

In step 1409, the system calls the ink canvas presenter 1420 watch selection method 1421. The watch selection method 1421 registers (1422) one for the selection service, selection changed event 1429. When the selection is changed, the ink canvas presenter may execute method 1423. In step 1424, the system determines if there is a selected in element in the selection service. If yes, the strokes collection 1425 is obtained. Next, the ink canvas is invalidated and no strokes are rendered in step 1426. If no from step 1424, the system unregisters from the selection service selection changed notification in step 1427. Finally, the system invalidates ink canvas 1428 and renders all strokes.

In step 1410, the system appends the selected ink element in the selection service 1429.

The differences between the two codepaths of FIGS. 13A and 13B and 14A and 14B include how the selection is initiated and who inserts the selected ink into the selection service.

Interface Definitions

The following provides a list of interface definitions that may or may not be used. It is appreciated that these interfaces are show for illustrative purposes only. The interfaces may be augmented or otherwise modified including separated and still remain within the scope of the aspects of the invention.

The InkEditor inheritance chain may appear as follows:

System.Object
  EditBehavior: IService
  Editor
    InkEditor

Included below are the class definitions for each of these classes.

IService

```
[TypeConverter(typeof(ServiceConverter))]
public interface IService
{
}
```

This interface may be used to associate implementing classes with the ServiceConverter. This allows a type conversion between a string and a service (for parser support).

EditBehavior: IService

```
public abstract class EditBehavior : IService
{
    internal void Attach(Element scope, EditRouter router)
    internal void Resume( )
    internal void Suspend( )
    internal void Detach( )
    internal void Cancel( )
    public static readonly DynamicEvent StartBehaviorEvent
    public static readonly DynamicEvent EndBehaviorEvent
    public virtual Type ServiceType{ get}
    public virtual Type AdornerSetType { get }
    public virtual object GetAdornerSet( )
    public Element BehaviorScope
    public bool IsSuspended { get }
    protected EditBehavior( ){ }
    protected virtual void OnAttach(Element scope, EditRouter router)
    protected virtual void OnResume( )
    protected virtual void OnSuspend( )
    protected virtual void OnDetach( )
    protected virtual void OnCancel( )
    protected object GetService(Type serviceType){ }
    protected object GetService(Type serviceType, Element element)
    protected ICollection GetSelectedComponents( )
    protected ICollection GetFilteredSelectedComponents( )
    protected InputManager GetInputManager( )
    protected Pointer GetPointer( )
    protected EditRouter ContainingEditRouter { get }
    protected IDesignerHost DesignerHost { get }
}
```

Editor: EditBehavior

```
public abstract class Editor : EditBehavior
{
    public static readonly AttachedProperty SelectionTypeProperty
    public abstract Type SelectionType { get }
    public abstract ISelection Selection { get }
}
```

InkEditor: Editor

```
namespace System.Windows.Design
{
    public class InkEditor : Editor
    {
        //DynamicProperties
        public static readonly AttachedProperty ServiceProperty;
        public static readonly AttachedProperty IsEnabledProperty;
        public static readonly AttachedProperty EditingModeProperty;
        public static readonly AttachedProperty InkCollectionBehaviorProperty;
        public static readonly AttachedProperty EraserBehaviorProperty;
        public static readonly AttachedProperty SelectionBehaviorProperty;
        public static readonly AttachedProperty CustomBehaviorProperty;
        public static readonly AttachedProperty MoveBehaviorProperty;
        //Constructor
        public InkEditor(Element serviceRoot);
        //EditBehavior overrides (Editor inherits from EditBehavior)
        protected override void OnAttach(Element scope, EditRouter router);
        protected override void OnDetach( )
        protected override void OnResume( )
        //Editor overrides
        public override Type SelectionType;
        public override ISelection Selection;
        //Private router event handlers
        private void OnPointerMove(DynamicComponent sender,
                    PointerPositionEventArgs args);
        private void OnPointerButtonDown(DynamicComponent sender,
                    PointerButtonEventArgs args);
        private void OnPointerButtonUp(DynamicComponent sender,
                    PointerButtonEventArgs args);
    }
}
```

InkSelection: ISelection

```
namespace System.Windows.Design
{
    public class InkSelection : ISelection
    {
        //DynamicProperties
        public static readonly AttachedProperty ServiceProperty;
        public static readonly AttachedProperty IsEnabledProperty;
        //Constructor
        public InkSelection(Element serviceRoot);
        public ISelectionService SelectionService {get};
        ISelection.ItemType {get};
        void ISelection.Clear( );
    }
}
```

InkCanvasPresenter: CanvasPresenter

```
namespace System.Windows.Presenters
{
    internal WatchSelection( )
}
```

SelectedInk: Object

```
namespace System.Windows.Controls
{
    public class SelectedInk
    {
        internal SelectedInk(Element, Strokes)
        public Strokes SelectedStrokes {get}
    }
}
```

SelectedInkDesigner: Designer

```
namespace System.Windows.Design
{
    public class SelectedInkDesigner : Designer
    {
        internal SelectedInkDesigner ( )
        public override bool ExtendBottom(Element element, float extendBy)
        public override bool ExtendLeft(Element element, float extendBy)
        public override bool ExtendRight(Element element, float extendBy)
        public override bool ExtendTop(Element element, float extendBy)
    }
}
```

Aspects of the present invention have been described in terms of illustrative embodiments thereof. Numerous other embodiments, modifications and variations within the scope and spirit of the appended claims will occur to persons of ordinary skill in the art from a review of this disclosure.

What is claimed is:

1. A process for associating an ink editor to an ink canvas, the process comprising:
   attaching the ink editor to the ink canvas,
   wherein the ink canvas comprises an ink canvas object that is configured to detect and respond to actions performed by the use of a stylus-based input device, the ink canvas object comprising constructors, properties, methods and events,
   wherein the ink editor manages customizable behaviors associated with editing modes supported by the ink canvas object,
   wherein the ink canvas object is configured to host one or more child elements and provide ink functionality to the one or more child elements, the ink functionality comprising the creation, editing, recognition and detection of ink,
   wherein the ink comprises information captured from the use of the stylus-based input device;
   determining an editing mode using a processing unit;
   handling user input based on the determined editing mode, wherein the one or more child elements are rendered and the ink is rendered with the one or more child elements.

2. The process according to claim 1, further comprising:
   upon determining the editing mode is ink, then activating an ink collection behavior.

3. The process according to claim 1, further comprising:
   upon determining the editing mode is erase, then activating an erase behavior.

4. The process according to claim 1, further comprising:
   upon determining the editing mode is custom, then activating a custom behavior.

5. The process according to claim 1, further comprising:
   upon determining the editing mode is selection, then activating an ink selection behavior.

6. The process according to claim 5, further comprising:
   monitoring for up/down events and move events;
   performing one or more actions based on the up/down events and move events.

7. The process according to claim 1, further comprising:
   upon determining the editing mode is selection, then activating, by the ink editor, an ink selection behavior, wherein:
      a cursor is associated with the stylus-based input device;
      when a cursor move event is detected:
         when the cursor is over an adorner, the cursor is changed to an edit behavior cursor by the ink editor;
         when the cursor is over a child element or selected ink element, the cursor is changed to a default cursor by the ink editor;
      when a cursor down event is detected:
         when the cursor is over an adorner, an edit behavior of the adorner is activated by the ink editor;
         when the cursor is over a child element or a selected ink element:
            when a move behavior is enabled, the move behavior is activated by the ink editor, wherein the move behavior continues until a curser up event is detected;
         when the cursor is not over an adorner, a child element or a selected ink element:
            when an ink selection behavior is enabled, a selection behavior is activated by the ink editor, wherein the selection behavior continues until a curser up event is detected.

8. A process for associating an ink editor to an ink canvas, the process comprising:
   attaching the ink editor to the ink canvas,
   wherein the ink canvas comprises an ink canvas object that is configured to detect and respond to actions performed by the use of a mouse or stylus- based input device,
   wherein the ink editor manages behaviors associated with editing modes supported by the ink canvas object,
   wherein the ink canvas object is configured to host one or more child elements and provide ink functionality to the one or more child elements,
   wherein ink comprises information captured from the use of the mouse or stylus-based input device;
   determining an editing mode using a processing unit;
   handling user input based on the determined editing mode, wherein the one or more child elements are rendered and the ink is rendered for the one or more child elements by the ink canvas object.

9. The process according to claim 8, further comprising:
   upon determining the editing mode is ink, then activating an ink collection behavior;
   upon determining the editing mode is erase, then activating an erase behavior;
   upon determining the editing mode is custom, then activating a custom behavior;
   upon determining the editing mode is selection, then activating an ink selection behavior.

10. A process for associating an ink editor to an ink canvas, the process comprising:
    attaching the ink editor to the ink canvas,
    wherein the ink canvas comprises an ink canvas object that is configured to detect and respond to actions performed by the use of a mouse or stylus- based input device,
    wherein the ink editor manages behaviors associated with editing modes supported by the ink canvas object
    wherein the ink canvas object is configured to host one or more child elements and provide ink functionality to the one or more child elements,
    wherein ink comprises information captured from the use of the mouse or stylus-based input device;
    determining an editing mode using a processing unit;
    handling user input based on the determined editing mode, wherein the one or more child elements are rendered and at least one of the one or more child elements renders the ink for themselves.

11. The process according to claim 10, further comprising:
    upon determining the editing mode is ink, then activating an ink collection behavior;
    upon determining the editing mode is erase, then activating an erase behavior;
    upon determining the editing mode is custom, then activating a custom behavior;
    upon determining the editing mode is selection, then activating an ink selection behavior.

12. The process according to claim 10, further comprising:
    upon determining the editing mode is selection, then activating an ink selection behavior, the ink selection behavior facilitating a selection of a portion of the ink, wherein the selected portion of the ink is manipulated, the manipulation comprising:
    moving the selected portion of the ink;
    resizing the selected portion of the ink; and
    rotating the selected portion of the ink.

13. The process according to claim 10, further comprising:
    upon determining the editing mode is selection, then activating an ink selection behavior, the ink selection behavior facilitating a selection of a portion of one of the one or more child elements.

* * * * *